United States Patent
Yasuura et al.

(10) Patent No.: US 10,768,112 B2
(45) Date of Patent: Sep. 8, 2020

(54) OPTICAL DETECTION DEVICE AND OPTICAL DETECTION METHOD

(71) Applicant: NATIONAL INSTITUTE OF ADVANCED INDUSTRIAL SCIENCE AND TECHNOLOGY, Tokyo (JP)

(72) Inventors: Masato Yasuura, Ibaraki (JP); Makoto Fujimaki, Ibaraki (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 0 days.

(21) Appl. No.: 16/317,461

(22) PCT Filed: Jul. 7, 2017

(86) PCT No.: PCT/JP2017/025013
§ 371 (c)(1),
(2) Date: Jan. 11, 2019

(87) PCT Pub. No.: WO2018/012436
PCT Pub. Date: Jan. 18, 2018

(65) Prior Publication Data
US 2019/0234875 A1    Aug. 1, 2019

(30) Foreign Application Priority Data
Jul. 12, 2016 (JP) .................... 2016-137658

(51) Int. Cl.
*G01N 21/64* (2006.01)
*G01N 21/41* (2006.01)
(Continued)

(52) U.S. Cl.
CPC ........... *G01N 21/645* (2013.01); *G01N 21/41* (2013.01); *G01N 21/47* (2013.01); *G01N 21/552* (2013.01);
(Continued)

(58) Field of Classification Search
CPC ...... G01N 21/41; G01N 21/47; G01N 21/552; G01N 21/64; G01N 21/645; G01N 21/648;
(Continued)

(56) References Cited

U.S. PATENT DOCUMENTS

2009/0168061 A1* 7/2009 Haga .................. G01N 21/6428
356/317
2009/0242802 A1  10/2009 Kimura
(Continued)

FOREIGN PATENT DOCUMENTS

| JP | 2001-511249 A | 8/2001 |
|---|---|---|
| JP | 2001-242083 A | 9/2001 |

(Continued)

OTHER PUBLICATIONS

Muhammmad Umar Khan et al., "Bloch surface wave structures for high sensitivity detection and compact waveguiding", Science and Technology of Advanced Materials, available online at https://dx.doi.org/10.1080/14686996.2016.1202082, posted Jun. 30, 2016, p. 398-409, vol. 17, No. 1, National Institute for Materials Science in partnership with Taylor & Francis, UK.
(Continued)

*Primary Examiner* — Mark R Gaworecki
(74) *Attorney, Agent, or Firm* — Michael Best & Friedrich LLP

(57) ABSTRACT

An optical detection method and an optical detection device quickly and accurately detects a micro target substance, such as an antigen, with high sensitivity by using an enhanced
(Continued)

electric field. The optical detection device includes: one or more light irradiation units; a detection plate having a laminate structure; a prism in close optical contact to a back surface side of the detection plate and having multiple light incident surfaces with different incidence angles; and a light detection unit which is placed on the front surface side of the detection plate and which detects an optical signal from a sample. Light from the light irradiation unit enters the light incident surfaces of the prism at a fixed angle with respect to the front surface of the detection plate, and the light passing through the prism is irradiated from the back surface side of the detection plate under a total reflection condition.

11 Claims, 9 Drawing Sheets

(51) Int. Cl.
| | | |
|---|---|---|
| | *G01N 21/55* | (2014.01) |
| | *G02B 27/56* | (2006.01) |
| | *G01N 21/47* | (2006.01) |
| | *G02B 26/08* | (2006.01) |
| | *G01N 21/552* | (2014.01) |

(52) U.S. Cl.
CPC ......... *G01N 21/64* (2013.01); *G02B 26/0883* (2013.01); *G02B 27/56* (2013.01); *G01N 2021/6439* (2013.01); *G01N 2021/6463* (2013.01)

(58) Field of Classification Search
CPC ... G01N 2021/6439; G01N 2021/6463; G02B 26/0886; G02B 27/56
See application file for complete search history.

(56) References Cited

U.S. PATENT DOCUMENTS

| | | | |
|---|---|---|---|
| 2011/0272596 A1 | 11/2011 | Haga et al. | |
| 2013/0078146 A1* | 3/2013 | Sando ................ | G01N 21/648 422/69 |
| 2016/0033408 A1* | 2/2016 | Narumi ............... | G01N 21/648 250/458.1 |

FOREIGN PATENT DOCUMENTS

| | | |
|---|---|---|
| JP | 2009-085714 A | 4/2009 |
| JP | 2009-244018 A | 10/2009 |
| JP | 2010-025857 A | 2/2010 |
| JP | 2010-038624 A | 2/2010 |
| JP | 2010-145408 A | 7/2010 |
| WO | WO-2007/029414 A1 | 3/2007 |
| WO | WO-2010/073605 A1 | 7/2010 |
| WO | WO-2010/087088 A1 | 8/2010 |
| WO | WO-1998/034098 A1 | 5/2011 |
| WO | WO-2011/058502 A2 | 5/2011 |
| WO | WO-2012/098758 A1 | 7/2012 |
| WO | WO-2013/011831 A1 | 1/2013 |
| WO | WO-2015/194663 A1 | 12/2015 |
| WO | WO-2016/012276 A1 | 1/2016 |

OTHER PUBLICATIONS

P. Munzert et al., "Multilayer coatings for Bloch surface wave optical biosensors", Surface & Coatings Technology, available online at https://doi.org/10.1016/j.surfcoat.2016.08.029, Aug. 12, 2016, p. 79-84, vol. 314, Elsevier.

Wolfgang Knoll, "Optical Characterization of Organic Thin Films and Interfaces with Evanescent Waves", MRS Bulletin/Jul. 1991, available online at https://doi.org/10.1557/S0883769400056517, Jul. 1991, p. 29-39, vol. 16, Issue 7, Material Research Society, Cambridge Core, UK.

King Hang Aaron Lau et al., "Highly Sensitive Detection of Processes Occurring Inside Nanoporous Anodic Alumina Templates: A Waveguide Optical Study", The Journal of Physical Chemistry B, available online at https://pubs.acs.org/doi/10.1021/jp0498567, Jun. 23, 2004, p. 10812-10818, vol. 108(30), American Chemical Society Publications, USA.

Makoto Fujimaki et al., "Silica-based monolithic sensing plates for waveguide-mode sensors", Optics Express, Apr. 28, 2008, p. 6408-6416, vol. 16, No. 9, The Optical Society of America, USA.

Makoto Fujimaki et al., "The design of evanescent-field-coupled waveguide-mode sensors", Nanotechnology, available online at https://doi.org/10.1088/0957-4484/19/095503, Feb. 11, 2008, p. 095503-1-95503-7, vol. 19, IOP Publishing Ltd., UK.

Makoto Fujimaki et al., "Detection of colored nanomaterials using evanescent field-based waveguide sensors", Optics Express, Jul. 19, 2010, p. 15732-15740, vol. 18, No. 15, The Optical Society of America, USA.

Makoto Fujimaki et al., "Parallel-incidence-type waveguide-mode sensor with spectral-readout setup", Optics Express, May 4, 2015, p. 10925-10937, vol. 23, No. 9, The Optical Society of America, USA.

R.P. Podgorsek et al., "Monitoring the diffusion of vapour molecules in polymer films using SP-leaky-mode spectroscopy", Sensors and Actuators B, May 1998, p. 146-151, vol. 51, Elsevier Science S.A.

Shinji Hayashi et al., "Fano resonance and plasmon-induced transparency in waveguide-coupled surface plasmon resonance sensors", Applied Physics Express, available online at https://doi.org/10.7567/APEX.8, Jan. 6, 2015, p. 022201-1-022201-4, vol. 8, The Japan Society of Applied Physics.

S. Hayashi et al., "Observation of Fano line shapes arising from coupling between surface plasmon polariton and waveguide modes", Applied Physics Letters, Feb. 1, 2016, p. 151101-1-151101-5, vol. 108, AIP Publishing LLC.

International Search Report, issued in Application No. PCT/JP2017/025013, dated Sep. 26, 2017.

* cited by examiner

OPTICAL DETECTION DEVICE AND OPTICAL DETECTION METHOD

TECHNICAL FIELD

The present invention relates to an optical detection device and an optical detection method for optically detecting a target substance or the like that exists in a liquid by utilizing an optical signal in a local area using an enhanced electric field.

BACKGROUND ART

In recent years, methods have been developed for detecting and determining the quantity of a micro substance existing in a solution, e.g. a bio-related substance, such as DNA, RNA, protein, a virus or a bacterium, by conjugating a fluorescent material, as a label, to such a bio-related substance and by exciting the emission of light from the label by using an enhanced electric field on the surface of a sensor chip. Further, there has been developed a method for fluorescently staining a tissue in a cell to fluorescently observe the stained particular region by using an enhanced electric field on the surface of a sensor chip. As a technique for generating the enhanced electric field used in the foregoing methods, a surface plasmon resonance (SPR) is well known.

The SPR uses an optical configuration referred to as Kretschmann configuration, in which the SPR is excited on a gold thin film on the surface of glass in contact with a prism by the total reflection of incident light at the interface between the gold thin film and a liquid sample thereby to form an enhanced electric field on the surface of the gold thin film. SPR-excitation-enhanced fluorescence spectroscopy is a technique for performing fluorescence observation with less background light by using light that has been enhanced in the vicinity of the surface of a gold thin film by the SPR as the excitation light to excite fluorescent molecules existing in an enhanced electric field thereby to generate intense fluorescence (refer to Patent Document 1).

As with the SPR, an excitation mechanism of a guided mode (also referred to as an optical guided mode, a waveguide mode, an optical waveguide mode or the like) is well known as a mechanism capable of forming an enhanced electric field on the surface of a sensor chip (refer to Patent Documents 2 to 5 and Non-Patent Documents 1 to 6).

A configuration example of a conventional guided mode excitation mechanism is illustrated in FIG. 13. FIG. 13 illustrates a guided mode excitation mechanism using the Kretschmann configuration. The mechanism uses a detection plate 4 composed of a light transmissive substrate 9 (a sheet glass or the like), a metal layer or a semiconductor layer 10 formed thereon, and a light transmissive dielectric layer 11 further formed thereon. An optical prism is closely attached to the surface of the detection plate 4 on the opposite side from the surface on which the light transmissive dielectric layer 11 is formed (the interface relative to a sample 5) through the intermediary of a refractive index adjustment oil or an optical adhesive agent, and white light or laser light is irradiated from a first light irradiation unit 1 onto the detection plate 4 through a prism 3. The incident light is incident on the detection plate under a total reflection condition. At a particular incident angle, incident light having a particular wavelength is conjugated with a guided mode propagated in the layer structure on the detection plate, thus exciting the guided mode. When the guided mode is excited, the electric field of the light having the particular wavelength is enhanced on the front surface of the detection plate, thus forming an enhanced electric field. The wavelength of the light at which the enhanced electric field has been formed can be verified by measuring, by using a spectroscope, the wavelength at which the intensity of the reflected light has been attenuated.

In the detection plate, the guided mode excited in the detection plate having a metal layer formed on a light transmissive substrate is frequently referred to as a leaky mode, leakage mode or the like (refer to Non-Patent Document 7). Further, in a detection plate, it has been known that using silicon or germanium or a mixed material thereof is effective for the semiconductor layer formed on the light transmissive substrate. The light transmissive dielectric layer may be composed of a single dielectric material. However, it has been reported that an enhanced electric field of a higher electric field intensity can be formed if the light transmissive dielectric layer is formed by stacking a plurality of dielectric materials in laminate (refer to Non-Patent Documents 8 and 9).

While only p-polarized light can be used for the excitation of the SPR, both p-polarized light and s-polarized light can be used for the excitation of the guided mode. The wavelength of light at which the enhanced electric field is obtained by the excitation of the guided mode is determined by the refractive index of the substrate of a detection plate, the complex refractive index and the thickness of each layer, and the incident angle of incident light and the direction of polarization of incident light. Depending on these conditions, the guided mode is excited in a plurality of wavelength bands at one time. For example, if 0.75 mm-thick silica glass is used as a substrate, a 200 nm-thick silicon layer is used as a semiconductor layer, a 300 nm-thick $SiO_2$ glass layer is used as a light transmissive dielectric layer, and s-polarized white light is irradiated at a 67-degree incident angle onto the front surface of the detection plate through a silica glass prism, then three guided modes having electric field intensity peaks at wavelengths of 513 nm, 588 nm, and 736 nm are excited in a visible light region, as illustrated in FIG. 14.

Further, there has been reported a device in which a substrate is provided with a groove, and detection areas having inclined surfaces with different angles are formed on the bottom surface or a side surface of the groove, and different substances are optically detected on the individual inclined surfaces (refer to Patent Documents 6 and 7).

PRIOR ART DOCUMENTS

Patent Documents

Patent Document 1: WO 2015/194663
Patent Document 2: WO 2007/029414
Patent Document 3: JP 2009-085714
Patent Document 4: WO 2010/087088
Patent Document 5: WO 2012/098758
Patent Document 6: JP 2010-145408
Patent Document 7: WO 2013/011831

Non-Patent Documents

Non-Patent Document 1: W. Knoll, MRS Bulletin 16, pp. 29-39 (1991)
Non-Patent Document 2: K. H. A. Lau, L. S. Tan, K. Tamada, M. S. Sander, and W. Knoll, J. Phys. Chem. B108, pp. 10812 (2004)

Non-Patent Document 3: M. Fujimaki, C. Rockstuhl, X. Wang, K. Awazu, J. Tominaga, Y. Koganezawa, Y. Ohki, and T. Komatsubara, Optics Express 16, pp. 6408-6416 (2008)

Non-Patent Document 4: M. Fujimaki, C. Rockstuhl, X. Wang, K. Awazu, J. Tominaga, N. Fukuda, Y. Koganezawa, and Y. Ohki, Nanotechnology 19, pp. 095503-1-095503-7 (2008)

Non-Patent Document 5: M. Fujimaki, K. Nomura, K. Sato, T. Kato, S. C. B. Gopinath, X. Wang, K. Awazu, and Y. Ohki, Optics Express 18, pp. 15732-15740 (2010)

Non-Patent Document 6: M. Fujimaki, X. Wang, T. Kato, K. Awazu, and Y. Ohki, Optics Express 23, pp. 10925-10937 (2015)

Non-Patent Document 7: R. P. Podgorsek, H. Franke, J. Woods, and S. Morrill, Sensor. Actuat. B51 pp. 146-151 (1998)

Non-Patent Document 8: S. Hayashi et al. Applied Physics Express 8, 022201 (2015)

Non-Patent Document 9: S. Hayashi et al. Applied Physics Letters 108, 05101 (2016)

DISCLOSURE OF THE INVENTION

Problems to be Solved by the Invention

The technique for forming an enhanced electric field by the surface plasmon resonance presents a problem in that the light wavelength at which an enhanced electric field is obtained is inconveniently limited by the metal material of a metal layer for generating the surface plasmon resonance. The technique for forming an enhanced electric field by the guided mode makes it possible to arbitrarily set the light wavelength, at which an enhanced electric field is obtained, according to the refractive index of the substrate of a detection plate, the complex refractive index and the thickness of each layer, and the incident angle of incident light and the direction of polarization of incident light (hereinafter referred to as the wavelength setting parameters). However, once the wavelength setting parameters are determined, although enhanced electric fields can be simultaneously formed at a plurality of particular wavelengths, as illustrated in FIG. 14, these wavelengths are uniquely determined by the determined wavelength setting parameters, and enhanced electric fields cannot be obtained at any two or more wavelengths. Thus, the enhanced fluorescence observation system using the conventional enhanced electric field has been posing a problem in that the fluorescence observation based on the excitation at any two or more wavelengths is difficult.

As a result, the method for performing fluorescence observation using an enhanced electric field for excitation light has been posing a problem in that there are restrictions in which only one excitation wavelength that can arbitrarily be set is available, so that the method is not compatible with a technique referred to as the multi-staining procedure, in which a plurality of different fluorochromes used in biology or the like are used to perform fluorescence observation by using a plurality of different excitation wavelengths.

According to a method for detecting a target substance by using the conventional enhanced electric field, the target substance is detected by adsorbing or bringing the target substance to or close to a detection plate. Hence, a fluorochrome adsorbed to a front surface of the detection plate in a non-specific manner or a fluorochrome adsorbed to a foreign substance adsorbed to the front surface of the detection plate in a non-specific manner cannot be discriminated from a fluorochrome adsorbed to the target substance, thus posing a problem of an inconvenient increase in noise.

The present invention has been made to solve the problems described above, and an object of the present invention is to provide an optical detection device and an optical detection method which make it possible to obtain enhanced electric fields at any two or more wavelengths when performing the fluorescence observation or the like of a sample by using an enhanced electric field for an excitation light. Another object of the present invention is to provide an optical detection device and an optical detection method which make it possible to eliminate the influence of a noise attributable to the non-specific adsorption of a label or a foreign substance so as to enable a target substance to be detected with higher sensitivity when optically detecting the target substance by using an enhanced electric field.

Means for Solving Problems

To this end, the present invention has the characteristics described below.

(1) An optical detection device including: one or more light irradiation units; a detection plate which has a laminate structure formed by stacking a light transmissive substrate, a metal layer or a semiconductor layer, and a light transmissive dielectric layer in this order from a back surface toward a front surface; a prism which is optically closely contacted to a back surface side of the detection plate and has a plurality of light incident surfaces, at least two of the light incident surfaces being different in incident surface angles, which are the angles formed between the light incident surfaces and the front surface of the detection plate; a sample holding unit capable of holding a sample containing a target substance on the front surface of the detection plate; and a light detection unit which is placed on the front surface side of the detection plate and which detects an optical signal from a detection area of the sample, wherein the optical detection device is placed such that light from the light irradiation unit enters the plurality of light incident surfaces of the prism at one angle fixed with respect to the front surface of the detection plate, and the light passing through the prism is irradiated from the back surface side of the detection plate under a condition that satisfies a total reflection condition in the detection plate, and the optical signal is detected by the light detection unit.

(2) The optical detection device described in the foregoing (1), wherein the light from the light irradiation unit enters the plurality of light incident surfaces of the prism in parallel to the front surface of the detection plate.

(3) The optical detection device described in the foregoing (1) or (2), wherein light irradiated from the one or more light irradiation units enters from at least two of the light incident surfaces of the prism.

(4) The optical detection device described in any one of the foregoing (1) to (3), wherein the light irradiated from the one or more light irradiation units that has entered from at least two of the light incident surfaces of the prism illuminates the same detection area on the front surface of the detection plate.

(5) The optical detection device described in any one of the foregoing (1) to (4), wherein the prism is a triangular or trapezoidal prism having at least two different base angles.

(6) The optical detection device described in any one of the foregoing (1) to (4), wherein the prism is a polygonal pyramid prism or a polygonal frustum prism having at least two different base angles.

(7) The optical detection device described in any one of the foregoing (1) to (6), including a rotation mechanism which makes it possible to relatively rotate the light incident surfaces of the prism with respect to one light irradiation unit such that the light from the light irradiation unit is enabled to enter a plurality of light incident surfaces of the prism.

(8) The optical detection device described in the foregoing (1), wherein the light transmissive dielectric layer is composed of a laminate of one or more types of dielectric materials.

(9) An optical detection method including: by using a prism which is optically closely contacted to a back surface side of a detection plate having a laminate structure formed by stacking a light transmissive substrate, a metal layer or a semiconductor layer, and a light transmissive dielectric layer in this order from a back surface toward a front surface, and which has a plurality of light incident surfaces, at least two of the light incident surfaces being different in incident surface angles, which are the angles formed between the light incident surfaces and the front surface of the detection plate, emitting light to a plurality of light incident surfaces of the prism at one angle fixed with respect to the front surface of the detection plate and irradiating the light through the prism from the back surface side of the detection plate under a condition that satisfies a total reflection condition in the detection plate, and detecting an optical signal from a sample in one detection area of the front surface of the detection plate by using an enhanced electric field which has different wavelength characteristics dependent on each of the light incident surfaces being different in the incident surface angles.

(10) The optical detection method described in the foregoing (9), wherein at least one of the optical signals is an optical signal emitted by a target substance.

(11) The optical detection method described in the foregoing (9), wherein at least one of the optical signals is an optical signal emitted by a label conjugated to a target substance.

Advantageous Effects of the Invention

The optical detection device according to the present invention enables enhanced electric fields to be obtained at any two or more wavelengths. Observing a target substance by using an enhanced electric field having different wavelength characteristics makes it possible to achieve clearer, quicker and more accurate optical detection. Further, according to the present invention, enhanced electric fields at any two or more wavelengths can be obtained, thus making the present invention extremely well suited for a multi-staining procedure, in which fluorescence observation is performed using a plurality of different excitation wavelengths by using a plurality of different fluorochromes used in biology or the like. Further, according to the present invention, when optically detecting a target substance by using enhanced electric fields at any two or more wavelengths, the influence of a noise attributable to the non-specific adsorption of a label or a foreign substance can be eliminated, thus enabling a target substance to be detected with higher sensitivity.

According to the present invention, enhanced electric fields of a plurality of wavelengths can be excited in the same detection area existing on the front surface of the detection plate when light enters from the light incident surfaces by using a prism having a combination of base angles, in which the incident surface angles, which are angles formed between the light incident surfaces and the detection plate, are different.

According to the present invention, any combinations of the wavelengths of enhanced electric fields excited in the same detection area can be designed by properly selecting the combination of the base angles of a prism.

Further, in the case where the direction of irradiation of light when the light enters a prism from a light irradiation unit is set to be parallel to the front surface of the detection plate, there is no need for an angle precision adjusting mechanism, such as a goniometer, thus making the fabrication easier.

MODE FOR CARRYING OUT THE INVENTION

Figure 1A:
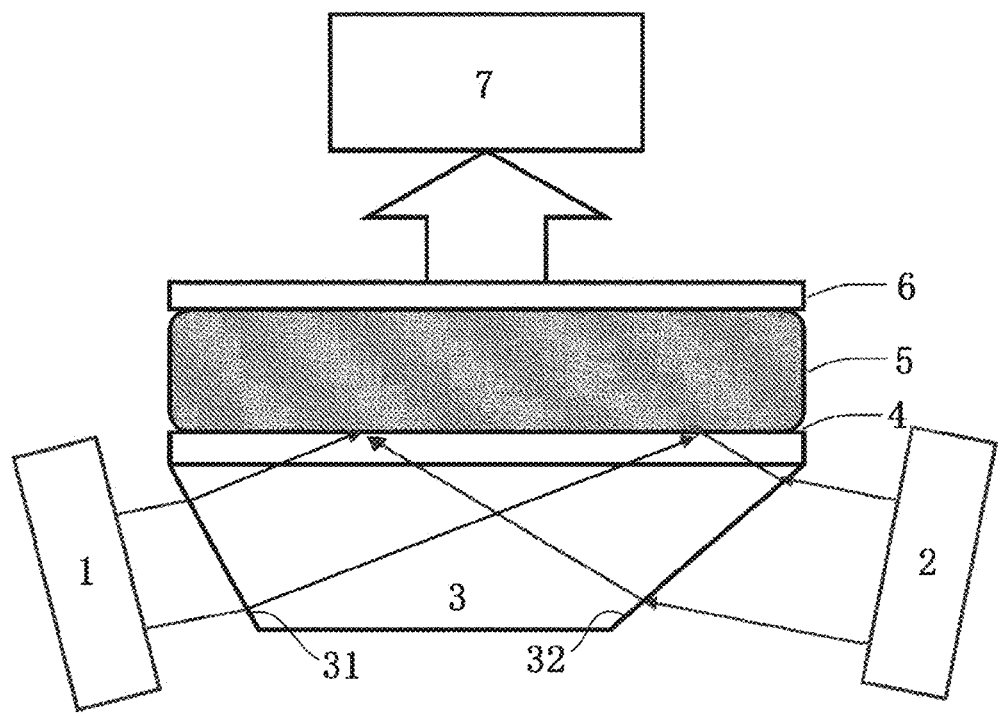
FIG. 1A is a schematic diagram illustrating a basic optical detection device in accordance with the present invention.

The following will describe embodiments of the present invention.

The present inventors have diligently devoted themselves in the research and development, focusing on generating enhanced electric fields at any two or more wavelengths by guided mode excitation, and have obtained a new concept of achieving clearer, quicker and more accurate detection of target substances by observing the target substances by using enhanced electric fields having different wavelength characteristics. The detection of target substances means the verification of the presence of the target substances, the determination of the quantity thereof, the fluorescence observation of the target substances, the acquirement of the two-dimensional images thereof, the acquirement of the videos thereof, and the like.

Unlike a conventional technique, in order to achieve the use of enhanced electric fields of different wavelengths, the optical detection device in accordance with the present invention uses, as a prism to be optically closely attached to the back surface side of a detection plate, a prism that has a plurality of light incident surfaces, at least two of the light incident surfaces having different incident surface angles, which are angles formed by the light incident surfaces and the front surface of the detection plate. The light incident surfaces refer to the surfaces, where the light irradiated from the light irradiation units enters, among a plurality of surfaces formed on the prism.

Unlike a conventional technique, in order to achieve the use of enhanced electric fields of different wavelengths, the optical detection method according to the present invention uses, as a prism to be optically closely attached to the back surface side of a detection plate, a prism that has a plurality of light incident surfaces, at least two of the light incident surfaces having different incident surface angles, which are angles formed by the light incident surfaces and the front surface of the detection plate. Using the prism, the light from light irradiation units is emitted to a plurality of light incident surfaces of the prism at one angle fixed with respect to the front surface of a detection plate and are irradiated through the prism from the back surface side of the detection plate under a condition that satisfies a total reflection condition in the detection plate so as to detect optical signals having different wavelength characteristics from a sample in one detection area of the front surface of the detection plate by using enhanced electric fields which have different wavelength characteristics dependent on the light incident surfaces having the different incident surface angles.

Entering "at one angle fixed" with respect to the front surface of the detection plate means that the angle of light entering a plurality of light incident surfaces of the prism from one or more light irradiation units is the same with respect to the front surface of the detection plate.

First Embodiment

The optical detection device according to a first embodiment of the present invention will be described with reference to the accompanying drawings.

The optical detection device according to the present embodiment is an optical detection device that detects a target substance existing in a sample by an optical signal. The optical signal refers to fluorescence and scattered light. FIG. 1A illustrates a basic form of the optical detection device according to the present embodiment. The optical detection device has at least a first light irradiation unit 1, a second light irradiation unit 2, a prism 3, a detection plate 4, a sample holder, and a light detection unit 7. In the drawing, the sample holder is composed of the detection plate 4 and a cover glass 6. The cover glass 6 is placed to sandwich a sample 5, which contains target substances, between itself and the detection plate 4 and to hold the sample 5 on the front surface of the detection plate 4. The prism 3 has light incident surfaces (a first light incident surface 31 and a second light incident surface 32). The first light irradiation unit 1 and the second light irradiation unit 2 emit light at one angle fixed with respect to the front surface of the detection plate 4 and irradiate the light onto the first light incident surface 31 and the second light incident surface 32 of the prism 3. The light irradiated from the first light irradiation unit 1 and the second light irradiation unit 2 is irradiated to a detection area of the front surface of the detection plate 4 from the back surface side of the detection plate 4 under a total reflection condition through the prism 3 optically bonded to the back surface of the detection plate 4. The light detection unit 7 is placed on the front surface side of the detection plate 4, and detects the optical signals emitted from target substances or labels as the light is irradiated from the first light irradiation unit 1 and the second light irradiation unit 2, an area on the front surface being a detection area.

In the embodiments of the present invention, a target substance can be detected by using the difference of the optical signals from a detection area produced by the first and the second light irradiations. FIG. 1 illustrates the detection plate 4 being placed below the sample 5. However, the detection plate 4 may alternatively be placed above or on the side of the sample 5.

Figure 1B:
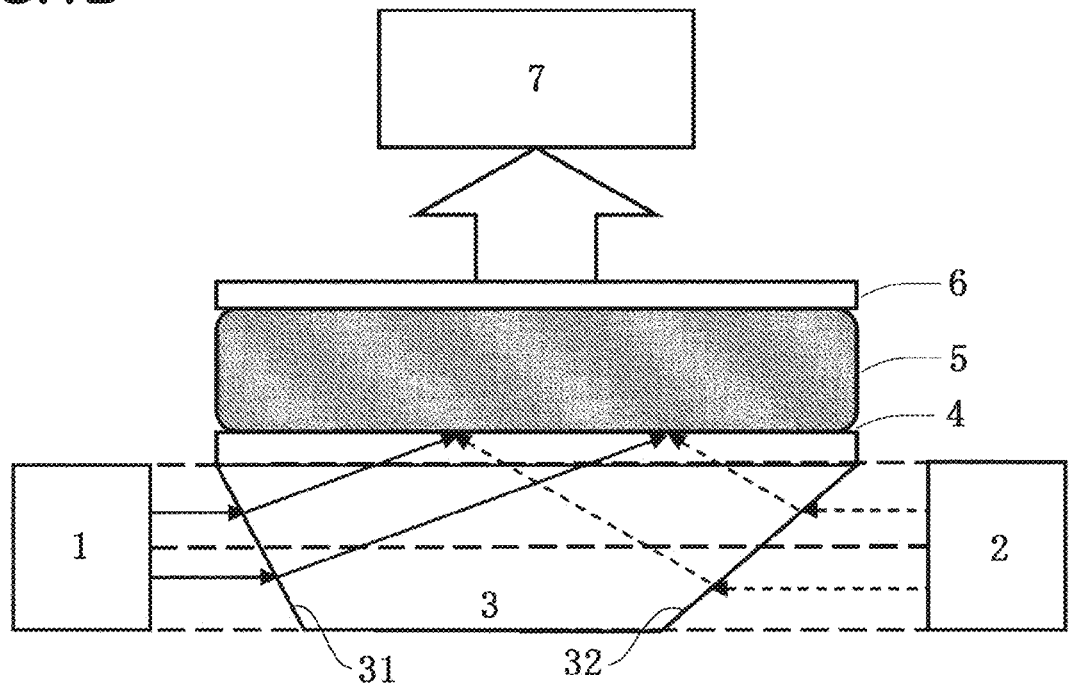
FIG. 1B is a schematic diagram illustrating a modification example of an optical detection device explained in a first embodiment of the present invention.

As a modification example of the optical detection device according to the present embodiment, the first light irradiation unit 1 and the second light irradiation unit 2 may be set to emit light in parallel to the front surface of the detection plate, as illustrated in FIG. 1B. This corresponds to the case where the angle at which the light is "emitted at one angle fixed with respect to the front surface of the detection plate" of the device illustrated in FIG. 1A is zero. In the present modification example, the light from the first light irradiation unit 1 and from the second light irradiation unit 2 enters the first light incident surface 31 and the second light incident surface 32, respectively, of the prism 3 in parallel to the front surface of the detection plate. An advantage of entering the light in parallel to the front surface of the detection plate is easier assembly of the device. In fact, when fabricating the optical detection device according to the present embodiment, the angle of the light to be irradiated to the prism 3 from the light irradiation units must take values determined in a designing stage. A deviation from the angles would cause the incident angle of the light entering the front surface of the detection plate to deviate, inconveniently generating an enhanced electric field at a wavelength that is different from an intended wavelength. To emit the light at a particular angle other than being parallel, a special device, such as a goniometer, would be required to adjust angles, leading to complicated angle adjustment. Meanwhile, in the case where the light irradiation units are installed and fixed such that the light is irradiated in parallel to the front surface of the detection plate, no complicated angle adjusting mechanism is required, thus permitting easy setting.

The following will describe the optical detection device according to the present embodiment in more detail.

[Sample Holder]

The sample holder includes the detection plate and is adapted to hold a sample, which contains a target substance to be introduced, and a label, which is to be added to the sample and conjugated to the target substance to form a conjugate, on the front surface of the detection plate. The sample holder may have any structure insofar as it can hold a sample, which contains a target substance, in contact with the detection plate. For example, if the sample is a liquid, then a publicly known liquid cell or a publicly known liquid flow passage having a size corresponding to a detection area may be used. If the sample is gel-like or a soft material, such as a cell, i.e., if the fluidity of the sample is low, then the sample holder may be configured by the detection plate itself, or may be configured to sandwich a sample between a light transmissive member, such as a cover glass, and the detection plate to hold the sample on the front surface of the detection plate. The sample holder is preferably configured to have a sample introduction section, and a hollow section that defines a space, which includes at least an enhanced electric field formation region on the front surface of the detection plate, by the detection plate and a covering section of the detection plate, at least a part placed between a detection area on the front surface of the detection plate and the light detection unit being light-transmissive. The configuration having the hollow section described above makes it easy to introduce a sample into the hollow section from the introduction section. Further, a detection area is a small region in the vicinity of the front surface of the detection plate, so that the amount of a sample can be stably decreased according to a set capacity of the hollow section. The sample holder may have multiple channels by fractionating the region in which a sample is held into a plurality of segments.

[Sample]

Samples include, for example, blood, saliva, urine, drugs, environmental water, water and sewerage, cells, and gels. Target substances include, for example, cells, bacteria, viruses, protein, and contaminants contained in samples, and protein contained in cells. The samples are not limited to the illustrated samples and may be anything that can be an object to be measured in the optical detection device. Further, the target substances are not particularly limited insofar as they are contained in samples and the existence thereof can be detected or the contents thereof can be measured or they can be observed in the form of images.

[Detection Plate]

Any detection plate can be used insofar as the detection plate enables a sample to be introduced onto a front surface thereof and enables an enhanced electric field to be formed by the guided mode in a detection area on the front surface of the detection plate by the light irradiated from the back surface side under a total reflection condition. The configuration of the detection plate is not particularly limited insofar as the detection plate has a laminate structure for exciting the guided mode. The detection plate can be appropriately selected according to a purpose, and a detection plate using a publicly known guided mode (including a leaky mode and a leaking mode) can be adopted. More specifically, any laminate structure can be employed insofar as the structure is formed by stacking a light transmissive substrate, a metal layer or a semiconductor layer, and a dielectric layer in this order from the back surface toward the front surface. Silicon or germanium or a mixed material of silicon and germanium is effectively used for the semiconductor layer formed on the light transmissive substrate. Further, the dielectric layer can also be configured by stacking a plurality of dielectrics having different refractive indices. The front surface of the detection plate is preferably an optically flat surface such that total reflection takes place. There are no particular restrictions on the material for forming the light transmissive substrate, and the material can be appropriately selected according to a purpose, and can be appropriately select from among publicly known light transmissive dielectrics, such as glass or plastics. The term "light transmissive" indicates that, for example, light transmissivity of a wavelength to be used is 0.5% or more. For example, preferably, visible light transmissivity is 0.5% or more.

[Prism]

The prism of the present embodiment has at least two surfaces on which the light irradiated from the light irradiation units is incident (the light incident surfaces). The prism is optically closely attached to the back surface side of the detection plate. The angles formed by the light incident surfaces of the prism and the front surface of the detection plate are referred to as the incident surface angles. Further, the angles formed by the light incident surfaces of the prism and the surface of the prism that is in contact with the detection plate are referred to as the base angles of the prism.

Figure 2A:
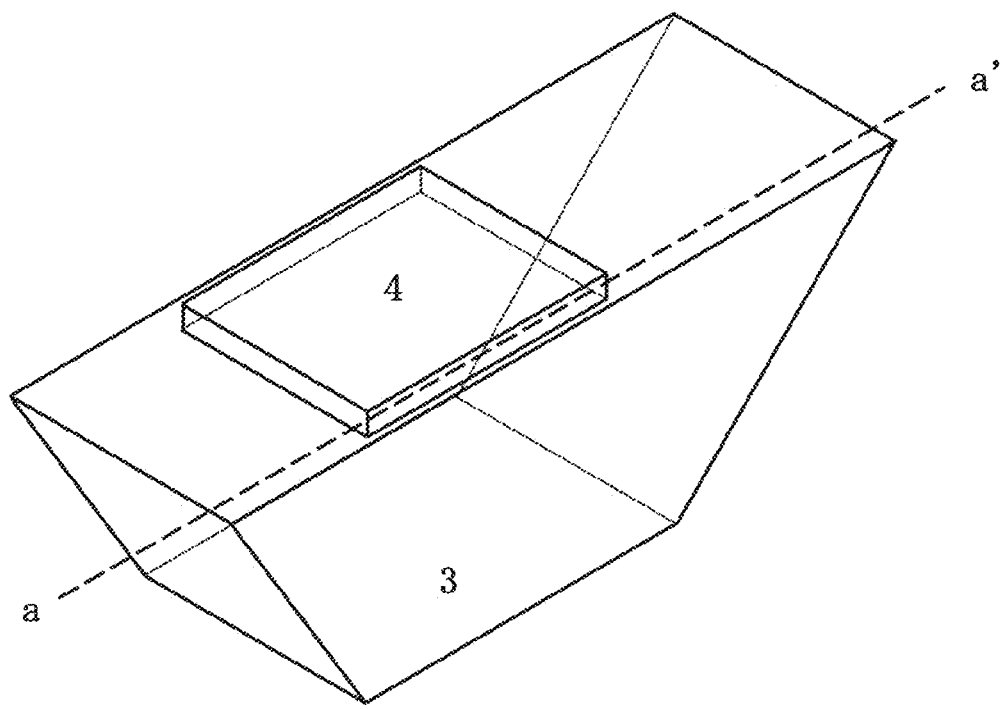
FIG. 2A is a perspective view illustrating the relationship between a prism and a detection plate used with the optical detection device of the first embodiment.
Figure 2B:
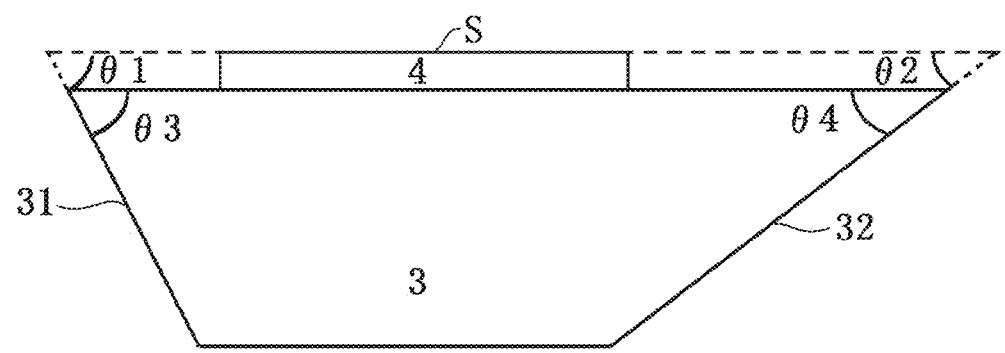
FIG. 2B is a sectional view taken on line a-a' in FIG. 2A.

According to the present embodiment, the light incident surfaces of the prism are required to be formed to have different incident surface angles. FIG. 2 presents diagrams illustrating the relationship between the prism 3 and the detection plate 4 used with the optical detection device of the present embodiment. FIG. 2A is a perspective view illustrating the detection plate 4 placed on the trapezoidal prism 3, and FIG. 2B is a sectional view taken on line a-a' in FIG. 2A. In this example, the prism 3 has two incident surfaces, namely, the first light incident surface 31 and the second light incident surface 32. In FIG. 2B, the angle formed by the first light incident surface 31 and a front surface S of the detection plate 4 (a first incident surface angle) is denoted by $\theta 1$, and the angle formed by the second light incident surface 32 and the front surface S of the detection plate 4 (a second incident surface angle) is denoted by $\theta 2$. If the detection plate 4 is a parallel plate, then a base angle $\theta 3$ of the first light incident surface 31 of the trapezoidal prism 3 and a base angle $\theta 4$ of the second light incident surface 32 are set such that $\theta 3 = \theta 1$ and $\theta 4 = \theta 2$, thereby making it possible to set the corresponding incident surface angles to $\theta 1$ and $\theta 2$. In other words, if the detection plate 4 is a parallel plate, then the "prism base angles" equal the "incident surface angles." Meanwhile, if the front surface and the back surface of the detection plate 4 are not parallel, then the "prism base angles" and the "incident surface angles" take different values. If the detection plate 4 is not a parallel plate and is an inclined plate, then the base angles $\theta 3$ and $\theta 4$ of the prism 3 are set by taking the inclination into account such that the incident surface angles will be desired $\theta 1$ and $\theta 2$. In the present invention, the prism 3 in which the first incident surface angle $\theta 1$ and the second incident surface angle $\theta 2$ have different values is used.

Figure 3:
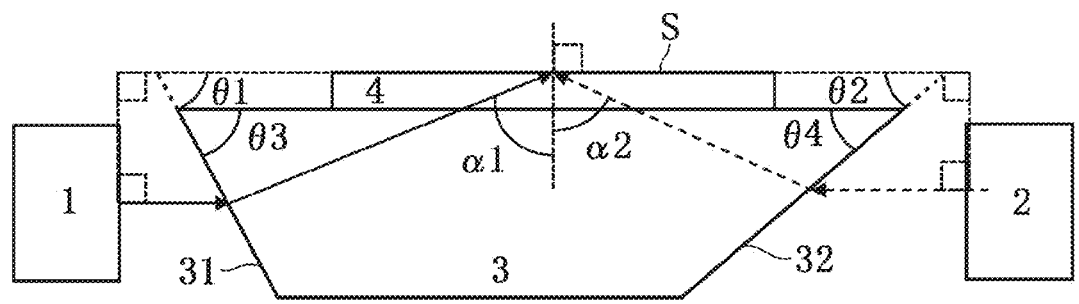
FIG. 3 is a diagram illustrating the placement relationship among light irradiation units, a prism and the detection plate in the optical detection device of the first embodiment.

FIG. 3 is a diagram illustrating the layout relationship among the light irradiation units (1 and 2), the prism 3, and the detection plate 4 in the optical detection device according to the present embodiment. The optical detection device illustrated in the drawing has two light irradiation units (the first light irradiation unit 1 and the second light irradiation unit 2). The detection plate 4 is a parallel plate. The prism 3 is a trapezoidal prism and has two light incident surfaces (31 and 32). The base angle $\theta 3$ of the first light incident surface 31 and the base angle $\theta 4$ of the second light incident surface 32 are $\theta 1$ and $\theta 2$, respectively, and $\theta 1$ and $\theta 2$ are different. Since the detection plate 4 is a parallel plate, the incident surface angles of the first incident surface angle and the second incident surface angle are $\theta 1$ and $\theta 2$, respectively. As illustrated in the drawing, setting is made such that the light from the light irradiation units (1, 2) is emitted in parallel to the surface S of the detection plate 4 and irradiated onto the light incident surfaces (31, 32). As illustrated in the drawing, the light irradiated onto the first light incident surface 31 is diffracted due to the difference in refractive index between air and the prism 3, causing the light to change the optical path thereof and then enters the detection plate 4 at an incident angle α1. The light irradiated onto the second light incident surface 32 is diffracted due to the difference in refractive index between air and the prism 3, causing the light to change the optical path thereof and then enters the detection plate 4 at an incident angle α2. Since θ1 and θ2 are different, the angles α1 and α2 take different values. Both the incident angles α1 and α2 of the light entering the detection plate front surface are required to be a critical angle or more in order for the total reflection of light to take place on the detection plate front surface.

If the refractive index of the prism and the detection plate substrate are denoted by n, then the relationship between θi and αi (i=1, 2) in FIG. 3 is represented by expression (MATH 1) given below. Air surrounds the prism, and the refractive index thereof is 1.

$$\alpha i = \theta i + \arcsin\left(\frac{\cos\theta i}{n}\right) \qquad \text{[MATH 1]}$$

When the refractive index n of the prism used and the incident angle αi corresponding to a desired wavelength are determined from the relational expression of (MATH 1), then the required incident surface angle θi will be uniquely determined. The expression of (MATH 1) is a relational expression applied in the case where the light from the light irradiation unit enters the light incident surface of the prism in parallel to the front surface of the detection plate, as illustrated in FIG. 3. If the light from the light irradiation unit enters a light incident surface at one fixed angle that is not parallel to the front surface of the detection plate, then the required incident surface angle θi will be uniquely determined when the one fixed angle and the incident angle αi corresponding to the refractive index n of the prism used and the desired wavelength are determined.

The wavelength of light at which an enhanced electric field can be obtained by the excitation of the guided mode is determined by the refractive index of the substrate of the detection plate, the complex refractive index and the thickness of each layer, and the incident angle of incident light and the direction of polarization of incident light. In other words, even if the structure of the detection plate remains the same, enhanced electric fields at different wavelengths can be obtained by changing the incident angle of incident light. As illustrated in FIG. 3, when white light is irradiated from the first light irradiation unit 1 and from the second light irradiation unit 2, the light irradiated from the light irradiation units enters the detection plate at different incident angles, thus generating enhanced electric fields at different wavelengths. Therefore, in order to generate enhanced electric fields at two desired wavelengths λ1 and λ2, the first incident surface angle θ1 is set such that, for example, the incident angle α1 that causes the enhanced electric field to be generated at λ1 will be obtained and the second incident surface angle θ2 is set such that the incident angle α2 that causes the enhanced electric field to be generated at λ2 will be obtained, thus making it possible to obtain the enhanced electric field at the two desired wavelengths.

The specific examples of the detection plate and the prism for obtaining the enhanced electric field at two wavelengths will be described. A description will be given of an exemplary structure of the detection plate, which is formed by stacking a 25 nm-thick Si layer as a semiconductor layer and a 360 nm-thick $SiO_2$ layer as the light transmissive dielectric layer on a silica glass substrate. Further, the detection plate is a flat plate having an even thickness. The prism is a trapezoidal prism illustrated in FIG. 3, the base angle θ3 being 32° and θ4 being 35°. At this time, the first incident surface angle θ1 is 32° and the second incident surface angle θ2 is 35°. When s-polarized white light is irradiated to the first light incident surface 31 in parallel to the bottom surface, an enhanced electric field can be obtained at a 650-nm wavelength. Meanwhile, when the s-polarized white light is irradiated to the second light incident surface 32 in parallel to the bottom surface, an enhanced electric field can be obtained at a 590-nm wavelength. By simultaneously emitting light from two light incident surfaces to a detection area of the same range, the fluorescences of fluorochromes having the wavelengths thereof as the excitation wavelengths can be simultaneously excited. Further, if the light is emitted one by one in sequence rather than simultaneously being emitted, then the fluorescences of fluorochromes having the wavelengths thereof as the excitation wavelengths can be excited in sequence.

The two incident surface angles, e.g. θ1 and θ2 in FIG. 3, are determined by the desired wavelengths at which an enhanced electric field is to be obtained from the light that is incident on the first light incident surface and the second light incident surface. Further, the wavelength of light at which an enhanced electric field is obtained by the excitation of the guided mode also depends on the refractive index of the substrate of the detection plate, the complex refractive index and the thickness of each layer, and the direction of polarization of incident light, so that these parameters are taken into account when determining the wavelength.

Figure 4A:
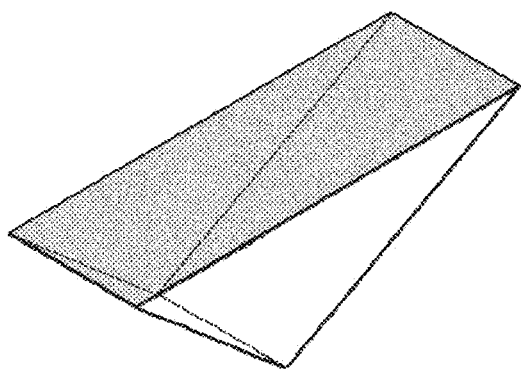
FIG. 4A is a diagram illustrating an example of the shape of the prism used with the optical detection device of the first embodiment.
Figure 4B:
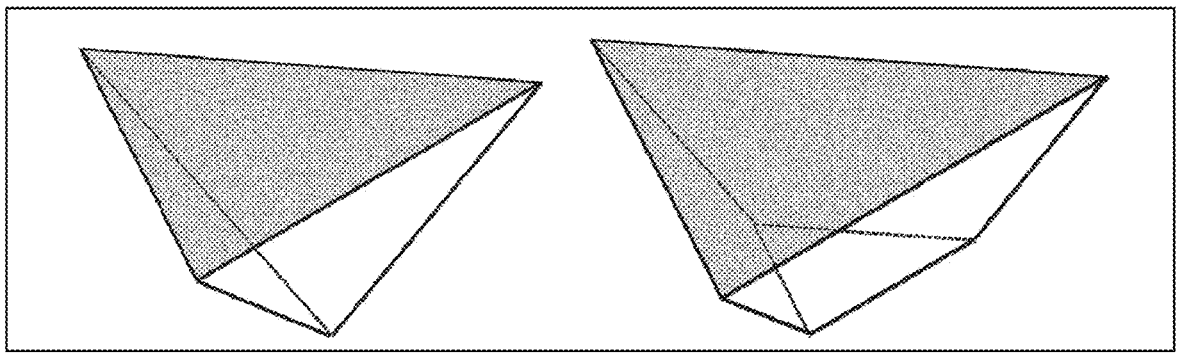
FIG. 4B is a diagram illustrating examples of the shape of the prism used with the optical detection device of the first embodiment.
Figure 4C:
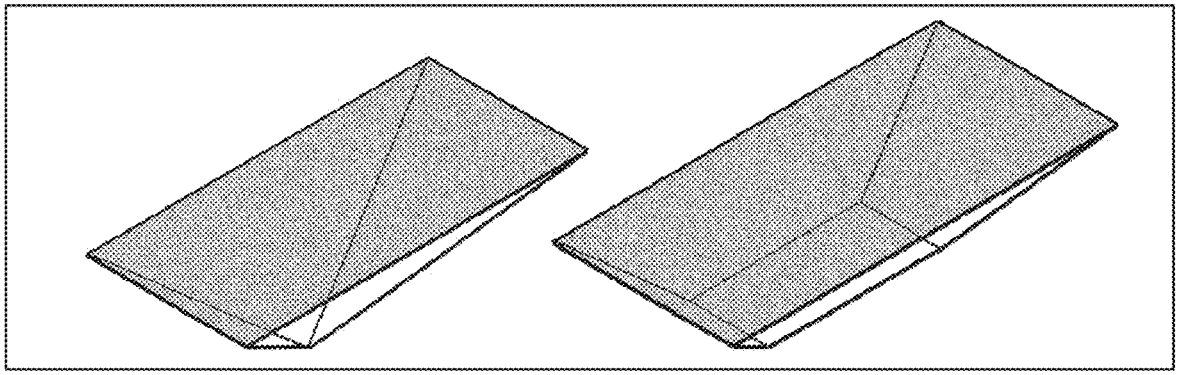
FIG. 4C is a diagram illustrating examples of the shape of the prism used with the optical detection device of the first embodiment.

FIGS. 2A and 2B and FIG. 3 illustrate, as the prism, the trapezoidal prism having different left and right base angles. Alternatively, a prism having a different shape may be used. FIG. 4 illustrates the examples of prisms having shapes suited for the optical detection device according to the present invention. In every prism, the back surface of the detection plate is optically closely attached to the upper surface (the gray part in the drawing). For example, the triangular prism having different left and right base angles, as illustrated in FIG. 4A, may be used. Further, to generate enhanced electric fields at three or more wavelengths, a prism having three or more light incident surfaces, such as a polygonal pyramid prism or a polygonal frustum prism, may be suitably used. Examples include a triangular pyramid prism or a triangular frustum prism as illustrated in FIG. 4B, or a quadrangular pyramid prism or a quadrangular frustum prism as illustrated in FIG. 4C. Which polygonal bottom surface is to be used can be selected according to a purpose. In addition to the triangular shapes and the quadrangular shapes in FIGS. 4B and 4C, pentagonal shapes, hexagonal shapes and the like may be used. Further, in the case where a prism having three or more light incident surfaces, such as a polygonal pyramid prism or a polygonal frustum prism, is used, it is unnecessary to set all of the incident surface angles to be different, insofar as at least two incident surface angles are different. For example, a quadrangular frustum prism may be used with an optical detection device that generates enhanced electric fields at three wavelengths. In this case, although up to four light incident surfaces can be formed in a quadrangular frustum prism, the incident surface angles with respect to three of the four light incident surfaces are set to be different.

According to the present invention, at least two incident surface angles are set to be different. The magnitude of the difference between the incident surface angles will be described with reference to FIG. 3. The light irradiation units (1 and 2) irradiate white light of a visible light range to the light incident surfaces (31 and 32) of the prism 3 in parallel to the surface S of the detection plate. If a detection plate that has a 25 nm-thick semiconductor layer composed of Si and a 360 nm-thick dielectric layer composed of $SiO_2$, which are on a silica glass substrate, is used as the detection plate, then an enhanced electric field having a central wavelength of 400 nm and a half-value width of 4.3 nm is formed when the first incident surface angle $\theta 1$ is 45.2°. In other words, efficient excitation of signal light can be accomplished in a wavelength band from a wavelength region of 397.8 nm to 402.2 nm. Meanwhile, when the second incident surface angle $\theta 2$ is 44.8°, an enhanced electric field having a central wavelength of 404.4 nm and a half-value width of 4.2 nm is formed. In other words, efficient excitation of signal light can be accomplished in a wavelength band of a wavelength region of 402.3 nm to 406.5 nm. In this case, if the value of $\theta 2$ is brought further closer to the value of $\theta 1$, then the wavelength regions in which effective excitation of signal light can be accomplished will overlap, resulting in wasted effort. In this case, therefore, the difference between $\theta 1$ and $\theta 2$ is preferably set to 0.4° or more.

In the case where the same light irradiation units (1 and 2) are used, the white light is irradiated in the same manner, and the same detection plate is used, if the first incident surface angle $\theta 1$ is 35.14°, then an enhanced electric field having a central wavelength of 550 nm and a half-value width of 10 nm is formed. In other words, efficient excitation of signal light can be accomplished in a wavelength band of a wavelength region of 545 nm to 555 nm. At this time, if the second incident surface angle $\theta 2$ is 34.6°, then an enhanced electric field having a central wavelength of 560.4 nm and a half-value width of 10.8 nm is formed. In other words, efficient excitation of signal light can be accomplished in a wavelength band of a wavelength region of 555 nm to 565.8 nm. In this case, if the value of $\theta 2$ is brought further closer to the value of $\theta 1$, then the wavelength regions in which effective excitation of signal light can be accomplished will overlap, resulting in wasted effort. In this case, therefore, the difference between $\theta 1$ and $\theta 2$ is preferably set to 0.54° or more.

In the case where the same light irradiation units (1 and 2) are used, the white light is irradiated in the same manner, and the same detection plate is used, if the first incident surface angle $\theta 1$ is 29.62°, then an enhanced electric field having a central wavelength of 700 nm and a half-value width of 27.6 nm is formed. In other words, efficient excitation of signal light can be accomplished in a wavelength band of a wavelength region of 686.2 nm to 713.8 nm. At this time, if the second incident surface angle $\theta 2$ is 29.1°, then an enhanced electric field having a central wavelength of 728 nm and a half-value width of 28.2 nm is formed. In other words, efficient excitation of signal light can be accomplished in a wavelength band of a wavelength region of 713.9 nm to 742.1 nm. In this case, if the value of $\theta 2$ is brought further closer to the value of $\theta 1$, then the wavelength regions in which effective excitation of signal light can be accomplished will overlap, resulting in wasted effort. In this case, therefore, the difference between $\theta 1$ and $\theta 2$ is preferably set to 0.52° or more.

As described above, although a preferred minimum value of the difference between $\theta 1$ and $\theta 2$ varies according to the angle at which the light from the light irradiation units is incident on the light incident surfaces of the prism or various types of materials used for the detection plate, the minimum value of the difference is preferably set to at least 0.4° or more, because efficient excitation of signal light can be accomplished in a wide band by the incidence of light from the light incident surfaces.

In the case where the light from the light irradiation units is irradiated to the light incident surfaces of the prism in parallel to the front surface of the detection plate, if the incident surface angle is 90° or more, then the light refracted at the incident surfaces will not advance in the direction of the detection plate, thus preventing the light from reaching the detection plate. On the other hand, if the incident surface angle is 30° or less, then the angle at which light is incident on the detection plate will be below a critical angle and the total reflection will not occur in some cases. For this reason, the difference between two incident surface angles is preferably 60° or less in the case of the foregoing parallel incidence.

In the case where the light from the irradiation units is irradiated to the light incident surfaces of the prism at one angle fixed with respect to the front surface of the detection plate, even if the incident surface angle is 90° or more, the light refracted at the incident surfaces can be irradiated to the detection plate by properly setting the foregoing one angle. In this case, however, the incident surface angle that satisfies a condition for preventing the angle at which light is incident on the detection plate from being below the critical angle will increase at the same time. For this reason, the difference between two incident surface angles is preferably 60° or less also in the case where light is irradiated at one angle as described above.

As the material for the prism, a material having the same refractive index as that of the light transmissive substrate of the detection plate is preferably used. The most preferred material for the prism is the same material as that of the light transmissive substrate. If the same formation material as that of the light transmissive substrate is selected for forming the prism, then the detection plate and the prism which are integrally molded into one piece can be used.

[Light Irradiation Unit]

The light irradiation unit emits light at one angle fixed with respect to the front surface of the detection plate and irradiates the light to a light incident surface of the prism. The light that has entered the prism is irradiated to a detection area from the back surface side of the detection plate under a condition that satisfies the total reflection condition in the detection plate. Under the condition that satisfies the guided mode excitation condition in the detection plate, the guided mode is excited by the irradiated light, thereby forming an enhanced electric field by the guided mode on the front surface of the detection plate. Thus, there are no particular restrictions on the light irradiation unit insofar as the light irradiation unit is capable of emitting light, which contains light of a desired wavelength at which an enhanced electric field is obtained, at one angle fixed with respect to the front surface of the detection plate, and irradiating the light to an incident surface of a prism, so that the light irradiation units can be appropriately selected according to a purpose. Further, the light irradiation unit or units are preferably placed such that the light which is irradiated from one or more light irradiation units and which is incident on at least two light incident surfaces of the prism illuminates the same detection area on the front surface of the detection plate.

Examples of the light source of the light irradiation unit include, for example, a publicly known lamp, LED, laser and the like which are capable of emitting light that contains light having a desired wavelength. If a white light source, such as a lamp or LED, is used, then light monochromated by using an optical filter, a diffraction grating or the like may be irradiated to the detection plate. Especially in the case where a fluorochrome is excited, light should be irradiated after removing unwanted light on a long wavelength side by an optical filter. This is because, a fluorochrome emits light at a wavelength that is longer than an excitation band, and if excitation light contains a long wavelength component, then the scattered light attributable to the long wavelength component may interfere with fluorescence observation. The wavelength band of a light source is preferably within the range of ultraviolet to infrared light region.

In the case where a radiation light source, such as a lamp, an LED or the like is used, a guide section, such as a collimate lens, which restricts the direction of irradiation of irradiation light to a specific direction, may be used. In the case where light is irradiated to a prism from a light source by guiding the light by an optical fiber or the like, it is effective to provide the exit end of the optical fiber with a collimate lens to turn the light coming out of the optical fiber into parallel light.

[Relative Rotation Mechanism of the Prism]

Preparing the same number of light irradiation units as the number of wavelengths at which enhanced electric fields are desired to be generated is all that is necessary. However, if the number of light irradiation units is smaller than the number of wavelengths at which enhanced electric fields are desired to be generated, then a prism may be rotated with respect to the light irradiation unit or the light irradiation unit may be rotated with respect to the prism.

Figure 5:
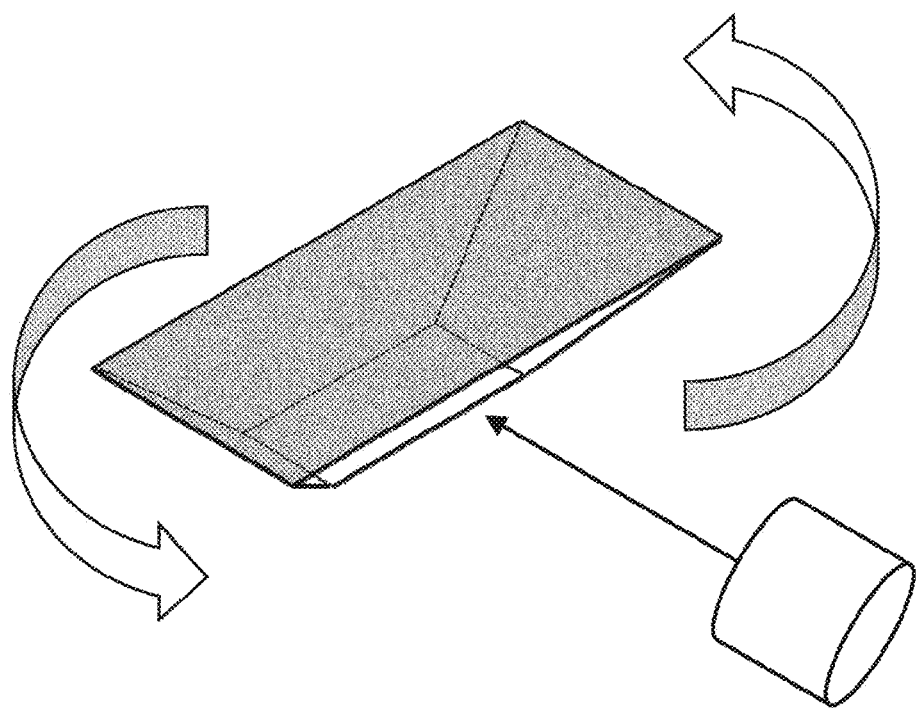
FIG. 5 is a diagram illustrating a prism rotation mechanism in the modification example of the optical detection device of the first embodiment.

FIG. 5 is a diagram illustrating a rotation mechanism which is a modification example of the present embodiment and which rotates a prism. A detection plate is optically brought into close contact with the gray region of the upper surface in FIG. 5. A description will be given of a method in which a quadrangular frustum prism is rotated with respect to a light irradiation unit to obtain enhanced electric fields at four wavelengths, as illustrated in FIG. 5. The four wavelengths at which the enhanced electric fields are desired to be obtained are denoted by $\lambda 1$, $\lambda 2$, $\lambda 3$, and $\lambda 4$. The wavelengths at this time have a relationship denoted by $\lambda 1 < \lambda 2 < \lambda 3 < \lambda 4$. The light incident surfaces corresponding to the individual wavelengths are a first light incident surface, a second light incident surface, a third light incident surface, and a fourth light incident surface, respectively. The light irradiation unit is to be capable of irradiating light that contains all these four light wavelengths. As illustrated in FIG. 5, first, when the light is incident on the first light incident surface, an enhanced electric field of the wavelength $\lambda 1$ is obtained. When the prism is rotated, and the light is emitted to the second light incident surface, an enhanced electric field is obtained at the wavelength $\lambda 2$. When the prism is rotated, and the light is emitted to the third light incident surface, an enhanced electric field is obtained at the wavelength $\lambda 3$. When the prism is rotated, and the light is emitted to the fourth light incident surface, an enhanced electric field is obtained at the wavelength $\lambda 4$. As has been previously described, when fluorescence is excited by a fluorochrome, the unwanted light on the long wavelength side should be removed by an optical filter before the irradiation. Therefore, when obtaining fluorescent signals in the enhanced electric fields at the wavelengths, it is desirable to place, in front of a light incident surface, an optical filter that cuts off light of any wavelengths which are approximately equal to or longer than the wavelengths of the fluorescent signals. The description here has been given of the case where the prism is rotated. Alternatively, the light irradiation unit may be rotated around the prism. Further, the light irradiation units may be prepared in any number insofar as the number is equal to or smaller than the number of light incident surfaces.

[Light Detection Unit]

The light detection unit is placed on the front surface side of the detection plate and is capable of detecting an optical signal emitted from a target substance in response to the irradiation of light, a specific range on the front surface being defined as a detection area. There are no particular restrictions on the light detection unit, so that a light detection unit can be appropriately selected according to a purpose, and a light detection unit, such as a publicly known photodiode, a photomultiplier tube or the like, can be used. When the information of an optical signal can be acquired as two-dimensional image information, the positional information of an optical signal in the two-dimensional image information that appears in the form of a light point, the size information observed on the two-dimensional image, or the information on the increase/decrease in the intensity of the optical signal at the light point can be observed in time series. Observing these pieces of information makes it possible to identify whether the light point relates to a target substance or indicates information related to the target substance, or indicates information not related to the target substance, such as a foreign substance, the fluctuation in light source output, or a scratch on the front surface of the detection plate. Further, the information can also be used for detection intended to acquire two-dimensional image information, such as cellular multiple fluorescent staining observation. Such two-dimensional image information can be acquired by selecting an imaging device as the light detection unit. There are no particular restrictions on the imaging device. An imaging device can be appropriately selected according to a purpose, and an image sensor, such as a publicly known CCD image sensor or a CMOS image sensor, can be used. When detecting the fluorescence from a target substance, an optical filter that removes excitation light is preferably installed in front of a light detection unit, because interference in the detection of fluorescence may be caused by the scattering or the like of the excitation light on the front surface of the detection plate.

[Label]

In the present embodiment, a label that emits an optical signal of fluorescence or scattered light by an enhanced electric field due to the guided mode may be conjugated to a target substance. A label is especially effective in the case where an optical signal of a target substance itself is weak, thus making detection difficult. The label functions to emit a stronger optical signal as a substitute of the target substance. There are no particular restrictions on the label, and a label can be appropriately selected according to a purpose. For example, a publicly known fluorescent substance or a substance that causes scattering of light can be used. Fluorescent substances include, for example, publicly known fluorescent substances, such as fluorochromes or quantum dots. Substances that cause scattering of light include nanoparticles, such as polystyrene beads, gold nanoparticles, magnetic particles and the like.

There are no particular restrictions on a method for the conjugation between a label and a target substance insofar as the method is for conjugating the two physically or chemically, and a method can be appropriately selected according to a purpose. For example, physical adsorption, antigen-antibody reaction, DNA hybridization, biotin-avidin bond, chelate bond, amino bond or the like can be used. Further, if a pigment is used as a label, then staining a target substance with a pigment is also an effective means for conjugating the label and the target substance.

In the physical adsorption, a label and a target substance are conjugated using an electrostatic bonding force of, for example, hydrogen bonding. The physical adsorption is advantageous in that the physical adsorption can be implemented easily, because there is no need to perform any special treatment of a label. However, a label in general has low selectivity, because the label does not specifically adsorb only to the target substance. In other words, the label may be conjugated also to a foreign substance other than the target substance contained in a sample, and the foreign substance may emit an optical signal, producing a noise.

On the other hand, if a label and a target substance are conjugated by using a reaction with high specificity, such as the antigen-antibody reaction, then the label is selectively conjugated only with the target substance, thus advantageously making it possible to detect with discrimination between the foreign substance and the target substance. In this case, however, if, for example, the target substance is an antigen, such as a virus, then an antibody against the virus must be conjugated to the label beforehand.

In the case where two or more different types of labels are conjugated to a target substance for the purpose of detection, any one of the conjugations is preferably a conjugation by a specific reaction with the target substance. This is because, if all conjugations take place in a non-specific manner, then it may not be possible to discriminate between a target substance and a foreign substance. Further, each of the two or more different types of labels preferably emits an optical signal having a different wavelength characteristic. This is because an optical signal of each label can be identified by detecting the difference of each optical signal.

In general, labels are stored, being dispersed in a solution, or stored in a powder form, and are mixed with a sample when used. There are no particular restrictions on the mixing method, and a mixing method can be appropriately selected according to a purpose. Methods that can be used include, for example, (1) a method in which a sample is placed in a sample holding part and then a label is mixed therein; (2) a method in which a label is placed in a sample holding part and then a sample is injected into the sample holding part; and (3) a method in which a sample and a label are mixed and then placed in a sample holding part.

If a surface for specifically capturing a target substance or a conjugate in a sample is formed on the front surface of a detection plate by using a means, such as transforming an antibody into a solid phase, then redundant labels can be removed by discharging the solution after mixing from the sample holding part and by rinsing thereby to suppress background signals. This leads to a desirable result that makes it possible to efficiently remove labels that have not formed conjugates, thus enabling detection with higher accuracy and higher sensitivity to be achieved.

[Surface Treatment of the Detection Plate]

The front surface of the detection plate may be provided beforehand with a chemical surface treatment that suppresses the non-specific adsorption of a label constituting a conjugate. The surface treatment is desirable, because the redundant labels not forming conjugates will not non-specifically adsorb to the front surface of the detection plate and will be easily removed from the front surface of the detection plate by rinsing. Especially when a surface for specifically capturing a target substance or a conjugate in a sample is used, an improved SN ratio can be expected by combining the implementation of the surface treatment. There are no particular restrictions on the surface treatment, thus enabling a surface treatment to be appropriately selected according to a purpose. For example, various types of blocking methods for suppressing the adsorption of protein or the like can be used. Examples of the blocking method include a method using polyethylene glycol, a method using ethanol amine, and a method using skim milk.

Providing the front surface of the detection plate with a chemical surface treatment that expedites the adsorption of a target substance makes it possible to efficiently attach a target substance to the front surface of the detection plate. For example, in the case where the fluorescent staining observation using cells as target substances, a surface suited for the adhesion of cell tissues can be formed by applying a publicly known surface treatment agent for tissue adhesion, such as 3-aminopropyltriethoxysilane, to the front surface of the detection plate.

Second Embodiment

Figure 6:
FIG. 6 is a diagram illustrating an optical detection method in a second embodiment.
Figure 6:
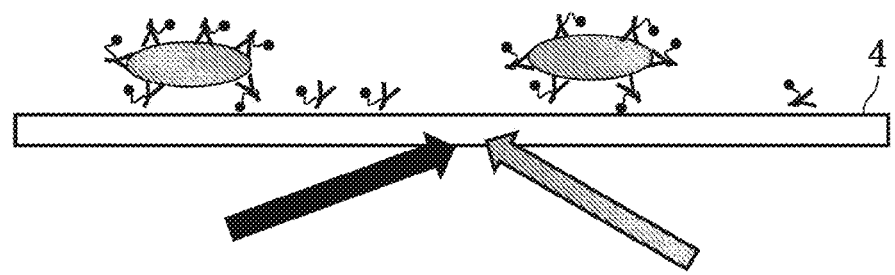

In the present embodiment, an optical detection method for detection using the optical detection device shown in the first embodiment will be described with reference to FIG. 6. FIG. 6 is a diagram illustrating the optical detection method. In the present embodiment, a description will be given, in particular, to a case where a target substance is large, and a plurality of fluorochrome binding antibodies can be conjugated. The present embodiment is the method for detection using the device of FIG. 1. Although not illustrated in FIG. 6, an enhanced electric field due to the guided mode formed by the light irradiated from the back surface side of a detection plate 4 under a total reflection condition is being generated on the front surface of the detection plate 4.

In FIG. 6, as an example of a first label, fluorochrome 1 binding antibodies will be described, being denoted by symbol A (Y's with black dots) in the drawing, and as an example of a second label, target substances directly fluorescently stained with a fluorochrome 2 will be described, being denoted by symbol B (hatched ellipse) in the drawing. The fluorochromes 1 are excited by an enhanced electric field produced by light irradiation from a first light irradiation unit 1. The fluorochromes 2 are excited by an enhanced electric field produced by light irradiation from a second light irradiation unit 2. The fluorochromes 1 and the fluorochromes 2 exhibit fluorescences (optical signals) having different wavelength characteristics.

In the enhanced electric field on the detection plate 4, fluorescences are generated from the fluorochrome 1 binding antibodies or the target substances that have been directly fluorescently stained. A plurality of fluorochrome 1 binding antibodies have been attached to the target substances, so that fluorescence signals that are larger than each of the fluorochrome 1 binding antibodies that have not been conjugated to the target substances can be obtained from the target substances by the light irradiation from the first light irradiation unit 1. By the light irradiation from the second light irradiation unit 2, fluorescence signals from the target substances that have been directly fluorescently stained are obtained from the same positions as those of the fluorescence signals by the plurality of fluorochrome 1 binding antibodies that have been conjugated to the target substances. By combining two types of fluorescences to establish a standard for successful detection in which the fluorescence signals of both are detected from the same position, signals that would have been erroneously detected by using the fluorescence of only one of both can be excluded, thus making it possible to enhance the accuracy of detection.

For example, when a fluorescent label antibody that specifically conjugates with a target substance is used as a fluorochrome 1, and a fluorochrome, such as DAPI, which can directly stain the target substance, is used as the fluorochrome 2, the accuracy of detection can be enhanced by combining a fluorescent label antibody with high specificity and staining with low specificity according to the following method. DAPI can pass through a biological membrane and fluorescently stain DNA, so that DAPI will indiscriminately stain viruses having various cells or DNAs. For this reason, if only DAPI is used as a label, then a specific type of cell or virus cannot be detected among many cells or viruses. Further, if, for example, fluorescent label antibodies that specifically conjugate to specific viruses are used as labels, then it will be difficult to distinguish the fluorescent label antibodies conjugated to viruses from the fluorescent label antibodies not conjugated to viruses, because the viruses are too small to be seen under an optical microscope. Therefore, by using, for example, both DAPI and a fluorescent label antibody, it is possible to acquire, in the form of two-dimensional image information, a position at which both the fluorescence of DAPI that has stained the DNA of a virus and the fluorescence of the fluorescent label antibody conjugated to the virus can be detected. As a result, erroneous detection that may occur in the case where the fluorochrome of only one of the foregoing two is used can be prevented, and the viruses existing in the vicinity of the front surface of the detection plate can be detected.

Further, as an application of the present embodiment, in the observation of cell tissues or the like, the two-dimensional image information of the multi-staining procedure that fluorescently stains different tissues can be acquired by enhanced fluorescence observation. For example, by using a cell as a target substance, an enhanced fluorescence observation image of the cell can be imaged by using a sample obtained by staining the nucleic acid by a nucleic acid staining fluorochrome, such as DAPI, and carrying out multiple fluorescent staining procedure that stains a cytoskeleton by an anti-tubulin fluorescent labeled antibody.

Third Embodiment

Figure 7:
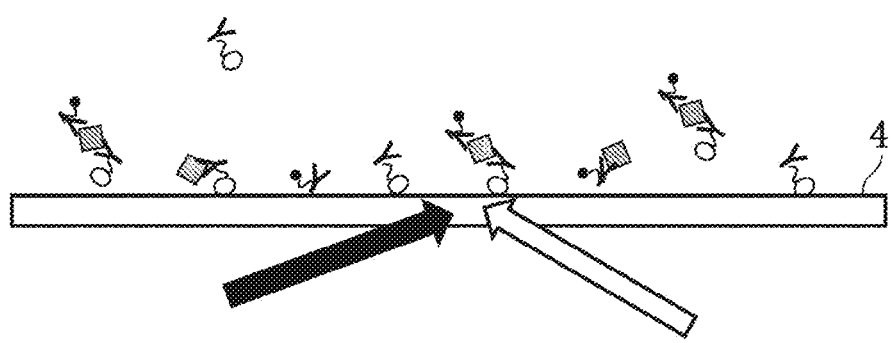
FIG. 7 is a diagram illustrating an optical detection method in a third embodiment.

In the present embodiment, a description will be given of an optical detection method for detection using the optical detection device shown in the first embodiment with reference to FIG. 7. FIG. 7 is a diagram illustrating an optical detection method that is different from the second embodiment. In the present embodiment, a description will be given of the case of a structure in which a target substance is sandwiched by a fluorochrome 1 binding antibody and a fluorochrome 2 binding antibody. The present embodiment is a method for detection using the device of FIG. 1. Although not illustrated in FIG. 7, an enhanced electric field due to the guided mode formed by the light irradiated from the back surface side of a detection plate 4 under a total reflection condition is being generated on the front surface of the detection plate 4.

In FIG. 7, fluorochrome 1 binding antibodies will be described, being denoted by symbol A (Y's with black dots) in the drawing, as an example of a first label, target substances will be described, being denoted by symbol C (hatched square) in the drawing, and fluorochrome 2 binding antibodies will be described, being denoted by symbol D (Y's with white dots) in the drawing, as an example of a second label. The fluorochrome 1 binding antibodies are excited by an enhanced electric field produced by light irradiation from a first light irradiation unit 1. The fluorochrome 2 binding antibodies are excited by an enhanced electric field produced by light irradiation from a second light irradiation unit 2. The fluorochrome 1 and the fluorochrome 2 exhibit fluorescences (optical signals) having different wavelength characteristics.

FIG. 7 illustrates a situation in which each of the target substances has been sandwiched between the fluorochrome 1 binding antibody and the fluorochrome 2 binding antibody and concentrated in the vicinity of a detection plate by gravitational sedimentation. At this time, fluorescences are emitted from the fluorochrome 1 binding antibodies and the fluorochrome 2 binding antibodies on the detection plate 4 due to an enhanced electric field. Since each of the target substances is sandwiched, a fluorescence signal from the fluorochrome 1 binding antibody is obtained at the position of the target substance by the light irradiation from the first light irradiation unit 1 and a fluorescence signal from the fluorochrome 2 binding antibody is obtained at the position of the target substance by the light irradiation from the second light irradiation unit 2.

As illustrated in FIG. 7, if two types of substances to be specifically conjugated to the target substances are used, then the accuracy of detection can be enhanced by conjugating different fluorescent substances and paying attention only to a point at which the two types of fluorescence can be simultaneously observed. For example, if specific fluorescent label antibodies are used for particular viruses, then it will be difficult to distinguish the fluorescent label antibodies conjugated to viruses from the fluorescent label antibodies not conjugated to viruses, because the viruses are too small to be seen under an optical microscope. Therefore, for example, two types of fluorescent label antibodies (hereinafter referred to as the first label antibody and the second label antibody), which have different fluorochromes conjugated thereto, are used for two types of antibodies that conjugate to different regions of the same virus, thereby making it possible to acquire, in the form of two-dimensional image information, a position at which the fluorescences of both the first label antibody and the second label antibody, which have conjugated to the virus, can be detected. As a result, only the optical signal (fluorescence) emitted by the conjugate of "the first label antibody—virus—the second label antibody" can be identified, so that erroneous detection that may occur in the case where the fluorochrome of only one of the foregoing two label antibodies can be prevented, and the viruses existing in the vicinity of the front surface of the detection plate can be detected.

Figure 8:
FIG. 8 is a fluorescence observation image by one fluorochrome among different wavelengths in the third embodiment.
Figure 9:
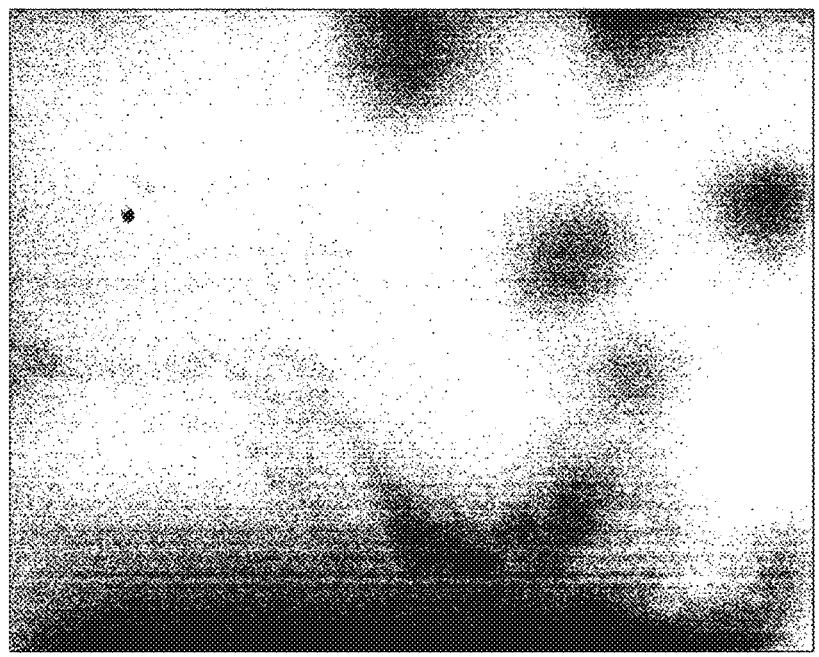
FIG. 9 is a fluorescence observation image by another fluorochrome among different wavelengths in the third embodiment.
Figure 10:
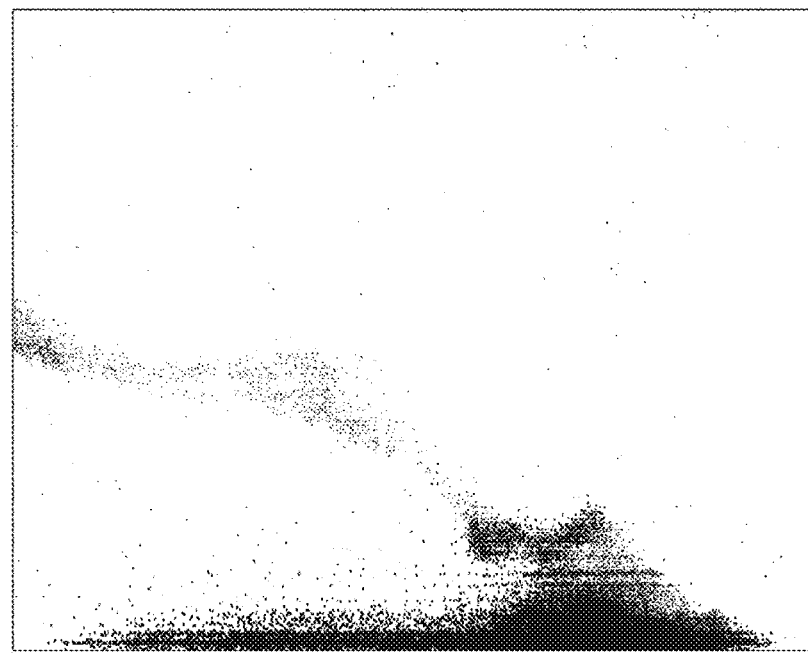
FIG. 10 is a diagram illustrating a range in which fluorescences by two fluorochromes have been observed from the same place in the third embodiment.

An example in which the present embodiment has been actually implemented will be described in more detail. To utilize an antigen-antibody reaction, two specific species of antibodies (anti-mouse/rabbit IgG and anti-mouse/donkey IgG) were prepared as the objects to be measured, and Alexa Fluor (registered trademark) 647 (having an excitation wavelength of 650 nm and a fluorescence wavelength of 665 nm) was conjugated as a fluorochrome 1 to the anti-mouse/rabbit IgG, and Alexa Fluor (registered trademark) 594 (having an excitation wavelength of 590 nm and a fluorescence wavelength of 617 nm) was conjugated as a fluorochrome 2 to the anti-mouse/donkey IgG. The detection plate is a flat plate having an even thickness and has a structure in which a 25 nm-thick Si layer as a semiconductor layer and a 360 nm-thick $SiO_2$ layer as the light transmissive dielectric layer are stacked on a silica glass substrate. The prism is a trapezoidal prism illustrated in FIG. 3, a base angle θ3 being 32° and a base angle θ4 being 35°. At this time, a first incident surface angle θ1 is 32° and a second incident surface angle θ2 is 35°. When s-polarized white light is irradiated to the first light incident surface 31 in parallel to the bottom surface, an enhanced electric field can be obtained at a 650-nm wavelength. Meanwhile, when the s-polarized white light is irradiated to the second light incident surface 32 in parallel to the bottom surface, an enhanced electric field can be obtained at a 590-nm wavelength. The foregoing fluorochrome binding antibodies of the two species and a normal mouse IgG, which would be an antigen, were mixed, and a mixed solution of 10 µl was introduced onto the front surface of the substrate of the optical system. As the light source, a wavelength-variable light source SM-10YN (having a wavelength range of 300 to 1100 nm, a half-value width of 10 nm, and a 150-W Xe lamp made by Bunkoukeiki Co., Ltd.) was used. Monochromatic light having a central wavelength of 650 nm was incident on the first light incident surface 31, and monochromatic light having a central wavelength of 590 nm was incident on the second light incident surface 32. The Alexa Fluor (registered trademark) 647 and the Alexa Fluor (registered trademark) 594 emit fluorescences in the enhanced electric field of the excitation wavelength band of each pigment. The excitation light was shut off by using an optical filter corresponding to the fluorescence wavelength of each fluorochrome, and the front surface of the substrate was observed by a cooled CMOS camera CS-51M (1.3 megapixels; made by Bitran Corporation). The fluorescences of the two species could be observed. A point at which the fluorescences could be verified in the fluorescence observation of both fluorescences is the place where a sandwiched antigen exists. FIG. 8 illustrates a fluorescence observation image observed through a 670-nm bandpass filter (having a half-value width of 10 nm; made by Asahi Spectra Co., Ltd.). FIG. 9 illustrates a fluorescence observation image observed through a 620-nm bandpass filter (having a half-value width of 10 nm; made by Asahi Spectra Co., Ltd.). The fluorescences could be observed in the black parts against the white backgrounds in both cases, and the excitation of each fluorochrome by the enhanced electric field could be verified. FIG. 10 illustrates the region, in which the fluorescences of both the Alexa Fluor (registered trademark) 647 and the Alexa Fluor (registered trademark) 594 were detected, by black against the white background. Thus, the place where the sandwiched antigen exists can be detected by observing the fluorescences from the two types of fluorochromes due to the enhanced electric field.

Fourth Embodiment

Figure 11:
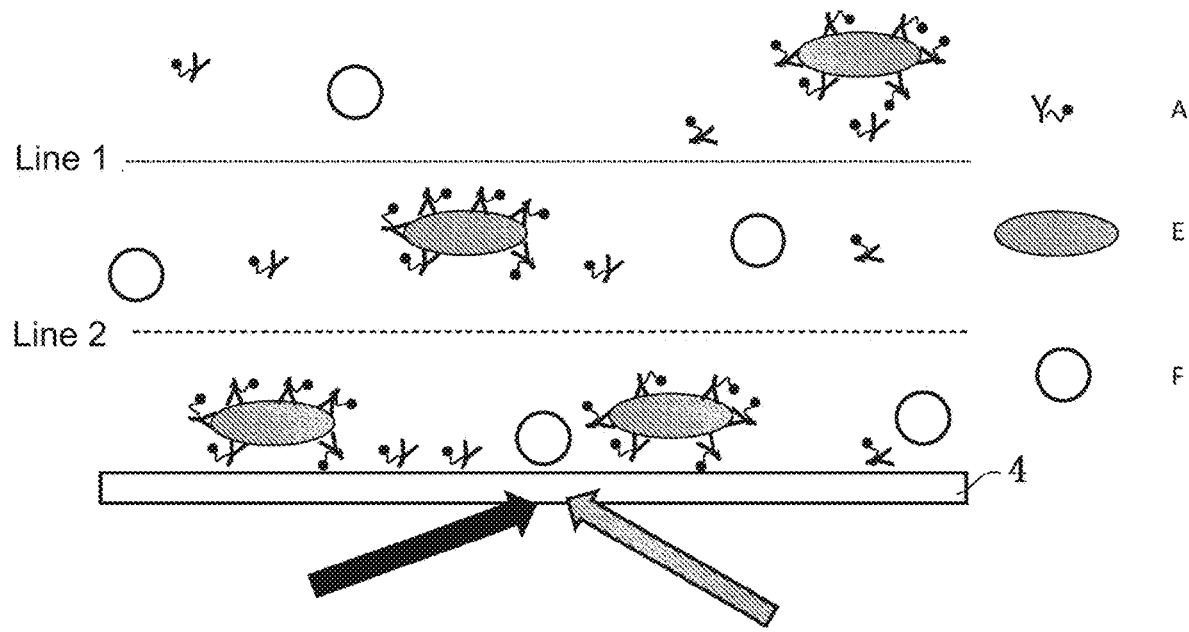
FIG. 11 is a diagram illustrating an optical detection method in a fourth embodiment.

In the present embodiment, an optical detection method for detection using the optical detection device shown in the first embodiment will be described with reference to FIG. 11. FIG. 11 is a diagram illustrating the optical detection method that is different from the second and the third embodiments. The present embodiment will describe especially the case where the target substances are large and the scattered light of the target substances can be utilized. The present embodiment is a method for detection using the device of FIG. 1. Referring to FIG. 11, an enhanced electric field due to the guided mode, which is formed by the light irradiated from the back surface side of the detection plate 4 under total reflection condition, is being generated on the front surface of a detection plate 4, and the light from a first light irradiation unit 1 and the light from a second light irradiation unit 2 are different in exuding height.

In FIG. 11, fluorochrome 1 binding antibodies will be described, being denoted by symbol A (Y's with black dots) in the drawing, as the examples of first labels, target substances that generate scattered light in a detection area will be described, being denoted by symbol E (hatched ellipses) in the drawing, as the examples of target substances, and photoresponsive foreign substances that generate scattered light in the detection area, as with the target substance, will be described, being denoted by symbol F (white circles) in the drawing. The fluorochrome 1 binding antibody is excited by an enhanced electric field produced by light irradiation from the first light irradiation unit 1. The target substances and the foreign substances generate scattered light in the enhanced electric field due to light irradiation from the first light irradiation unit 1 and the second light irradiation unit 2. The enhanced electric field of the light from the first light irradiation unit 1 exudes to the position of line 1 in the drawing, and the enhanced electric field of the light from the second light irradiation unit 2 exudes to the position of line 2 in the drawing.

In the enhanced electric field due to the light irradiation from the first light irradiation unit 1, fluorescence or scattered light is generated from the fluorochrome 1 binding antibodies or the target substances and the foreign substances. A plurality of fluorochrome 1 binding antibodies are attached to each of the target substances, so that a fluorescence signal that is larger than each of the fluorochrome 1 binding antibodies that have not been conjugated to the target substances is obtained from a target substance by the light irradiation from the first light irradiation unit 1. At this time, scattered optical signals are also obtained from the target substance. On the other hand, the foreign substances in the enhanced electric field that has exuded to line 1 generate only scattered light in response to the light irradiation from the first light irradiation unit 1. Only scattered optical signals are obtained from the target substances and the foreign substances existing in the enhanced electric field, which has exuded to line 2, by the light irradiation from the second light irradiation unit 2. The signals of the target substances that have adsorbed to the front surface of the detection plate are removed by using the difference between the scattered light and the fluorescence, thus making it possible to observe only the target substances which are in the vicinity of the front surface of the detection plate in the height from line 2 to line 1 and which can freely move in the sample. Further, the continuous temporal observation of the target substances can be performed by identifying the light spots of the target substances which are in the vicinity of the front surface of the detection plate and which can freely move in the sample by using the difference at the start of the observation and by continuously capturing the scattered light of the light from the first light irradiation unit 1 attributed to the target substances.

Figure 12:
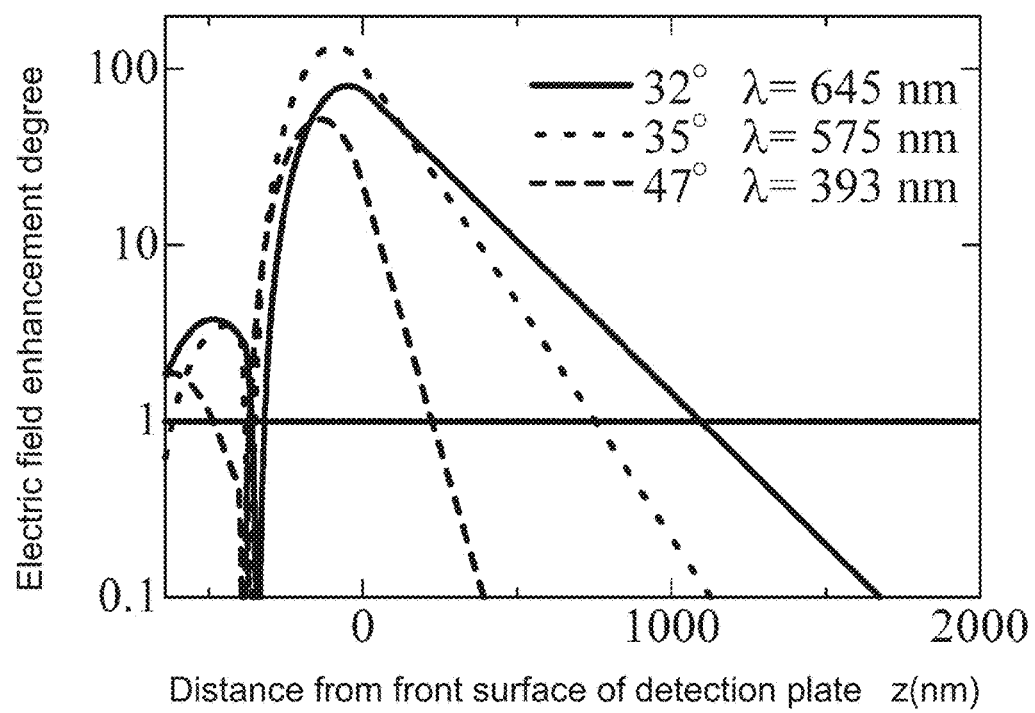
FIG. 12 is a diagram illustrating the relationship between the enhancement degree of electric field and distance in the fourth embodiment.
Figure 13:
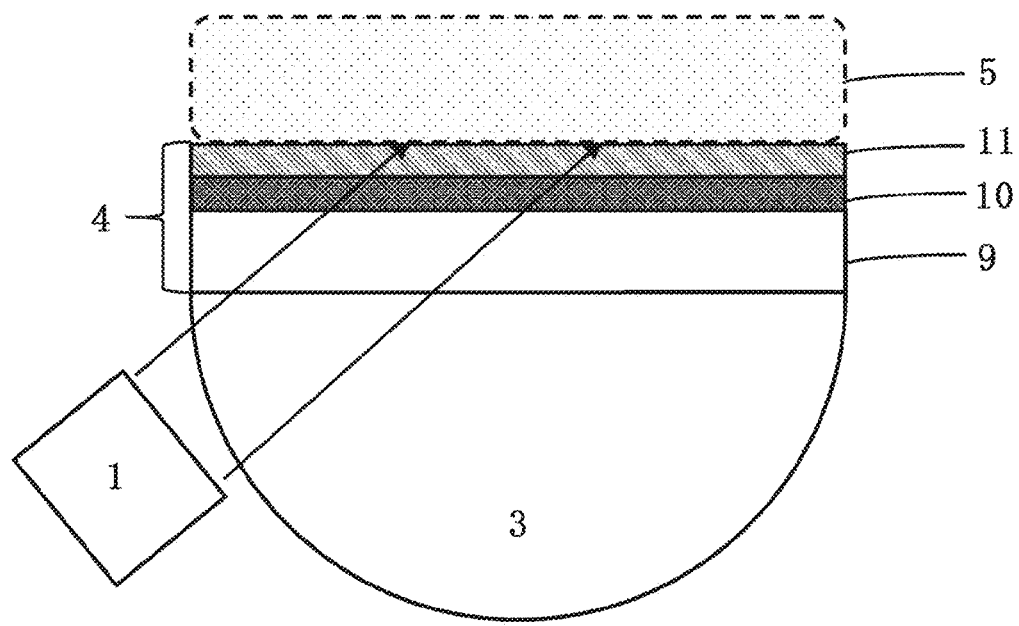
FIG. 13 is an explanatory diagram illustrating an example of the optical configuration of a guided mode excitation mechanism using the Kretschmann configuration, which is a conventional technique.
Figure 14:
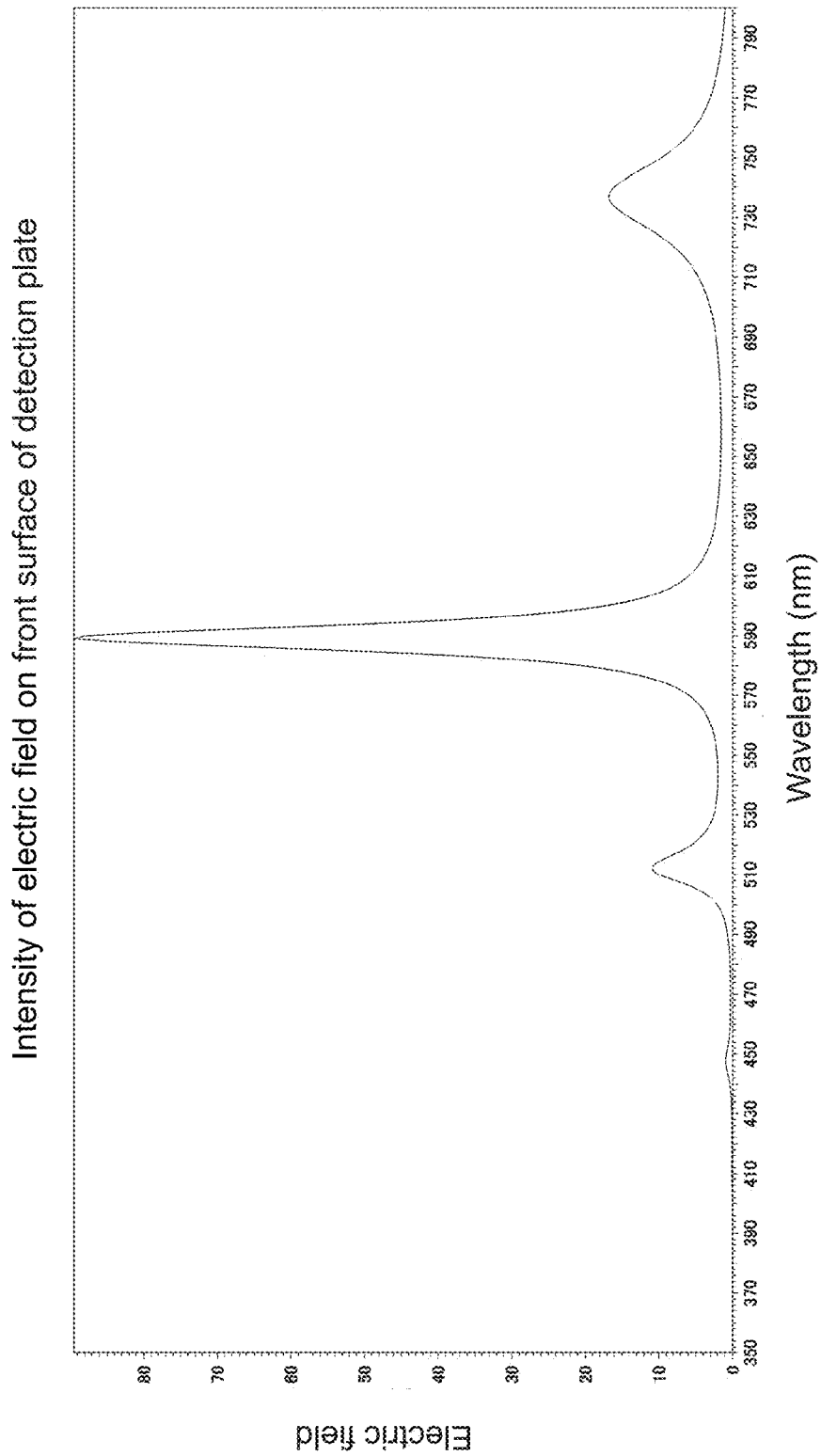
FIG. 14 is a diagram illustrating the relationship between the electric field intensity of an enhanced electric field generated by guided mode excitation and the incident wavelength.

FIG. 12 illustrates the relationship between the enhancement degree of electric field and the distance from the front surface of the detection plate. FIG. 12 illustrates the relationship between a distance z (nm) from the front surface of the detection plate and the enhancement degree of electric field (the enhancement ratio when the intensity of incident light is defined as 1) in the case where a detection plate having a 25 nm-thick semiconductor layer composed of Si and a 360 nm-thick dielectric layer composed of $SiO_2$, which are placed on a silica glass substrate, is used as the detection plate, and a protein is deposited to 20 nm as a surface modification. The silica glass substrate is a parallel plate. The light from a light irradiation unit enters the light incident surface of a prism in parallel to the front surface of the detection plate. At an incident surface angle of 32°, light in the wavelength band of 640 to 650 nm is enhanced by guided mode excitation, causing an electric field equal to or more than the incident light to exude to approximately 1100 nm beyond the front surface of the dielectric layer (the solid line in FIG. 12; λ=645 nm). At an incident surface angle of 35°, light in the wavelength band of 570 to 580 nm is enhanced by guided mode excitation, causing an electric field equal to or more than the incident light to exude to approximately 750 nm beyond the front surface of the dielectric layer (the dotted line in FIG. 12; λ=575 nm). At an incident surface angle of 47°, light in the wavelength band of 390 to 395 nm is enhanced by guided mode excitation, causing an electric field equal to or more than the incident light to exude to approximately 240 nm beyond the front surface of the dielectric layer (the dashed line in FIG. 12; λ=393 nm). The following detection can be performed by acquiring fluorescences having different excitation wavelengths as two-dimensional information. For example, whether a substance conjugated with both a fluorescent substance, which can be excited at 390 to 395 nm (e.g. a quantum dot), and a fluorescent substance, which can be excited at 640 to 650 nm (e.g. Alexa Fluor (registered trademark) 647 made by Thermo Fisher Scientific K.K.), exists in the vicinity of the front surface of the detection plate or at a position away from the front surface of the detection plate by approximately 240 nm or more can be identified by checking whether the fluorescences of both fluorochromes can be detected or only the fluorescence of the fluorescent substance that can be excited at 640 to 650 nm can be detected on the basis of the difference between the fluorescence observation images of the foregoing two fluorescent substances. This can be used to detect approximately which height range the target substances (e.g. tissues in cells) in a sample having a thickness of approximately 1 μm are distributed in.

The examples illustrated in the foregoing embodiments are described for easy understanding of the invention, and the present invention is not limited to the embodiments.

INDUSTRIAL APPLICABILITY

The optical detection device and method in accordance with the present invention can be widely applied to the fluorescence observation, two-dimensional imaging, or the like of a micro substance, including biologically relevant substances, such as DNA, RNA, proteins, viruses, and bacteria, and are industrially effective.

DESCRIPTION OF REFERENCE NUMERALS

1 first light irradiation unit
2 second light irradiation unit
3 prism
4 detection plate
5 sample
6 cover glass
7 light detection unit
9 light transmissive substrate
10 metal layer or semiconductor layer
11 light transmissive dielectric layer
31 first light incident surface
32 second light incident surface
A fluorochrome 1 binding antibody
B target substance directly fluorescently stained
C target substance
D fluorochrome 2 binding antibody
E target substance that generates scattered light in detection area
F photoresponsive foreign substance
S front surface of detection plate

The invention claimed is:

1. An optical detection device comprising:
one or more light irradiation units;
a detection plate which includes a laminate structure formed by stacking a light transmissive substrate, a metal layer or a semiconductor layer, and a light transmissive dielectric layer in this order from a back surface toward a front surface;
a prism which is optically closely contacted to a back surface side of the detection plate and has a plurality of light incident surfaces, at least two of the light incident surfaces being different in incident surface angles, which are the angles formed between the light incident surfaces and the front surface of the detection plate;
a sample holding unit capable of holding a sample that contains a target substance on the front surface of the detection plate; and
a light detection unit which is placed on the front surface side of the detection plate and which detects an optical signal from a detection area of the sample,
wherein the optical detection device is placed such that light from the light irradiation unit enters the plurality of light incident surfaces of the prism at one angle fixed with respect to the front surface of the detection plate, and the light passing through the prism is irradiated from the back surface side of the detection plate under a condition that satisfies a total reflection condition in the detection plate, and the optical signal is detected by the light detection unit.

2. The optical detection device according to claim 1, wherein the light from the light irradiation unit enters the plurality of light incident surfaces of the prism in parallel to the front surface of the detection plate.

3. The optical detection device according to claim 1, wherein light irradiated from the one or more light irradiation units enters from at least two of the light incident surfaces of the prism.

4. The optical detection device according to claim 1, wherein the light irradiated from the one or more light irradiation units that has entered from at least two of the light incident surfaces of the prism illuminates the same detection area on the front surface of the detection plate.

5. The optical detection device according to claim 1, wherein the prism is a triangular or trapezoidal prism having at least two different base angles.

6. The optical detection device according to claim 1, wherein the prism is a polygonal pyramid prism or a polygonal frustum prism having at least two different base angles.

7. The optical detection device according to claim 1, comprising a rotation mechanism which makes it possible to relatively rotate the light incident surfaces of the prism with respect to one light irradiation unit such that the light from the light irradiation unit is enabled to enter a plurality of light incident surfaces of the prism.

8. The optical detection device according to claim 1, wherein the light transmissive dielectric layer is composed of a laminate of one or more types of dielectric materials.

9. An optical detection method comprising:
by using a prism which is optically closely contacted to a back surface side of a detection plate having a laminate structure formed by stacking a light transmissive substrate, a metal layer or a semiconductor layer, and a light transmissive dielectric layer in this order from the back surface toward a front surface, and which has a plurality of light incident surfaces, at least two of the light incident surfaces being different in incident surface angles, which are the angles formed between the light incident surfaces and the front surface of the detection plate, emitting light to a plurality of light incident surfaces of the prism at one angle fixed with respect to the front surface of the detection plate, and irradiating the light through the prism from the back surface side of the detection plate under a condition that satisfies a total reflection condition in the detection plate, and detecting an optical signal from a sample in one detection area of the front surface of the detection plate by using an enhanced electric field which has different wavelength characteristics dependent on each of light incident surfaces being different in the incident surface angles.

10. The optical detection method according to claim 9, wherein at least one of the optical signals is an optical signal emitted by a target substance.

11. The optical detection method according to claim 9, wherein at least one of the optical signals is an optical signal emitted by a label conjugated to a target substance.

* * * * *